US010556989B2

United States Patent
Sudo et al.

(10) Patent No.: US 10,556,989 B2
(45) Date of Patent: Feb. 11, 2020

(54) END-MODIFIED POLYAMIDE RESIN AND METHOD FOR PRODUCING SAME

(71) Applicant: TORAY INDUSTRIES, INC., Tokyo (JP)

(72) Inventors: Ken Sudo, Nagoya (JP); Takuro Okubo, Nagoya (JP); Kenichi Utazaki, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/061,932

(22) PCT Filed: Dec. 21, 2016

(86) PCT No.: PCT/JP2016/088200
§ 371 (c)(1),
(2) Date: Jun. 13, 2018

(87) PCT Pub. No.: WO2017/110918
PCT Pub. Date: Jun. 29, 2017

(65) Prior Publication Data
US 2018/0371166 A1 Dec. 27, 2018

(30) Foreign Application Priority Data

Dec. 25, 2015 (JP) ................................. 2015-253618
Jan. 7, 2016 (JP) ................................. 2016-001542

(51) Int. Cl.
*C08G 69/26* (2006.01)
*C08G 69/40* (2006.01)
*C08G 69/10* (2006.01)
*C08G 69/14* (2006.01)
*C08L 71/00* (2006.01)

(52) U.S. Cl.
CPC ............. *C08G 69/40* (2013.01); *C08G 69/10* (2013.01); *C08G 69/14* (2013.01); *C08G 69/26* (2013.01); *C08L 71/00* (2013.01)

(58) Field of Classification Search
CPC ........ C08L 77/02; C08G 69/26; C08G 69/268
See application file for complete search history.

(56) References Cited

U.S. PATENT DOCUMENTS

| 4,808,675 A * | 2/1989 | Twilley .................... B32B 27/12 525/408 |
| 5,254,668 A | 10/1993 | Dominguez et al. |
| 5,342,918 A | 8/1994 | Howelton et al. |
| 6,828,412 B1 | 12/2004 | Brocchini et al. |
| 6,872,800 B1 | 3/2005 | Bouquerel et al. |
| 2003/0065084 A1 | 4/2003 | MacQueen et al. |
| 2010/0113690 A1* | 5/2010 | Glass .................... C08G 73/024 524/612 |
| 2014/0017328 A1 | 1/2014 | Kataoka et al. |
| 2016/0280856 A1 | 9/2016 | Kanda et al. |
| 2017/0015787 A1 | 1/2017 | Tamura |
| 2017/0190839 A1 | 7/2017 | Okubo et al. |

FOREIGN PATENT DOCUMENTS

| JP | 06145345 A | 5/1994 |
| JP | 2002544307 A | 12/2002 |
| JP | 2003528939 A | 9/2003 |
| JP | 2004123927 A | 4/2004 |
| JP | 2005524745 A | 8/2005 |
| JP | 2015105331 A | 6/2015 |
| WO | 0117515 A1 | 3/2001 |
| WO | 2012096399 A1 | 7/2012 |
| WO | 2015151410 A1 | 10/2015 |
| WO | 2015182693 A1 | 12/2015 |

OTHER PUBLICATIONS

International Search Report and Written Opinion for International Application No. PCT/JP2016/088200, dated Feb. 14, 2017, 6 pages.
Smith, S., "The Re-equilibration of Polycaproamide", Journal of Polymer Science, Prague Symposium, 1958, vol. 30, p. 459-478.
Explanation of Situation of Accelerated Examination for Japanese Application No. 2016-575594, PCT Application. No. PCT/JP2016/88200, dated May 1, 2017 with translation, 34 pages.
Written Opinion of the International Searching Authority for International Application No. PCT/JP2016/088200, dated Feb. 14, 2017, with translation, 9 pages.

* cited by examiner

*Primary Examiner* — Gregory Listvoyb
(74) *Attorney, Agent, or Firm* — Ratnerprestia

(57) ABSTRACT

Provided is an end modified polyamide resin containing 1 to 20% by mass of an end structure represented by the following general formula (I) and 0.1 to 5% by mass of an end structure represented by the following general formula (II):

$$—X—(R^1—O)_m—R^2 \qquad (I)$$

wherein m represents 2 to 100; $R^1$ represents a divalent hydrocarbon group having 2 to 10 carbon atoms, and $R^2$ represents a monovalent hydrocarbon group having 1 to 30 carbon atoms; —X— represents —NH—, —N(CH$_3$)— or —(C=O)—; and m $R^1$s in the general formula (I) may be the same or different, and $$—Y—R^3 \qquad (II)$$

wherein $R^3$ represents a monovalent hydrocarbon group having 1 to 30 carbon atoms; and —Y— in the general formula (II) represents —(C=O)— when X in the general formula (I) is —NH— or —N(CH$_3$)—, Y in the general formula (II) represents —NH— or —N(CH$_3$)— when X in the general formula (I) is —(C=O)—.

11 Claims, No Drawings

END-MODIFIED POLYAMIDE RESIN AND METHOD FOR PRODUCING SAME

CROSS REFERENCE TO RELATED APPLICATIONS

This is the U.S. National Phase application of PCT/JP2016/088200, filed Dec. 21, 2016, which claims priority to Japanese Patent Application No. 2015-253618, filed Dec. 25, 2015, Japanese Patent Application No. 2016-001542, filed Jan. 7, 2016, the disclosures of these applications being incorporated herein by reference in their entireties for all purposes.

TECHNICAL FIELD OF THE INVENTION

The present invention relates to an end modified polyamide resin which has a specific end structure, and is excellent in melt fluidity, thermal stability at melt retention, molding processability and mechanical physical properties.

BACKGROUND OF THE INVENTION

Polyamide resins have excellent characteristics such as an excellent mechanical characteristic and thermal characteristic, and are therefore widely used as materials for various molded articles such as fibers, various containers, films, electric and electronic components, automobile components and machine components.

In recent years, demands for miniaturization, complication, thinning and weight reduction of molded articles have been increased, and development of a material excellent in molding processability and excellent in mechanical characteristic is required. In addition, from the viewpoint of lowering a molding processing temperature and shortening a molding cycle, improvement of molding processability that contributes to reduction of environmental loading and reduction of energy costs is required. In general, an increase in molecular weight of a polyamide resin is known to improve the mechanical characteristic of the polyamide resin, but also has the effect of reducing the melt fluidity of the polyamide resin, resulting in deterioration of molding processability. When the molding processing temperature is increased, melt fluidity can be improved, but there is the problem that the mechanical characteristic and the appearance of a molded article are deteriorated because thermal stability is deteriorated, leading to occurrence of thermal decomposition that causes molecular weight reduction and gas generation during molding processing.

As a method for improving the thermal stability of a polyamide resin, for example, a method has been suggested in which thermal decomposition from the end of the polyamide resin is suppressed by blocking the amino end group and the carboxyl end group of the polyamide resin using acetic acid and diazomethane, respectively (see, for example, Non-Patent Document 1). By such a technique, thermal stability can be improved to increase the molding processing temperature, but there is the problem that the melt viscosity is still high, and molding processability is insufficient in view of demands for miniaturization, complication, thinning and weight reduction of molded articles in recent years.

In addition, as a polyamide resin excellent in mechanical properties and fluidity, a polyamide resin which contains a hydrocarbon group having 6 to 22 carbon atoms and has a relative viscosity of 2 or more and less than 2.5 has been suggested (see, for example, Patent Document 1). However, there is the problem that such a polyamide resin still has a high melt viscosity, and insufficient molding processability in view of demands for miniaturization, complication, thinning and weight reduction of molded articles in recent years. On the other hand, as a high-molecular-weight end modified polyamide resin having excellent molding processability and excellent crystallinity, an end modified polyamide resin containing 0.5 to 4.5% by mass of a specific end structure and having a relative viscosity $\eta r$ of 2.1 to 10 has been suggested (see, for example, Patent Document 2).

PATENT DOCUMENTS

Patent Document 1: Japanese Patent Laid-open Publication No. 6-145345
Patent Document 2: International Publication No. WO 2015/182693

Non-Patent Document

Non-Patent Document 1: "Journal of polymer science (J. Polym. Sci.)", PRAGUE SYMPOSIUM, 1958, Vol. 30, p. 459-478

SUMMARY OF THE INVENTION

The end modified polyamide resin described in Patent Document 2 is excellent in melt fluidity, but by a monoamine compound having a polyalkylene oxide structure, the polyalkylene oxide structure is introduced into the polyamide resin, and also the carboxyl end group is blocked. On the other hand, since the amino end group is not blocked at all, thermal decomposition from the amino end group and thermal decomposition of the polyalkylene oxide structure are accelerated at melt retention during molding processing or the like. Thus, there is the problem that introduction of the polyalkylene oxide structure to the end of the polyamide resin reduces the effect of melt fluidity.

An object of the present invention is to provide an end modified polyamide resin excellent in melt fluidity, thermal stability at melt retention, molding processability and mechanical physical properties.

The inventors of the present invention have extensively conducted studies for ensuring that a polyamide resin has both melt fluidity and thermal stability at melt retention, and as a result, it has been found that when the polyamide resin contains specific amounts of a specific polyalkylene oxide structure (I) and a specific hydrocarbon group structure (II) at the end of the polyamide resin, the above-mentioned object can be achieved, leading to attainment of the present invention. That is, the present invention has the following constitutions.

[1] An end modified polyamide resin containing 1 to 20% by mass of an end structure represented by general formula (I) below and 0.1 to 5% by mass of an end structure represented by general formula (II) below:

$$—X—(R^1—O)_m—R^2 \qquad (I)$$

wherein m represents 2 to 100; $R^1$ represents a divalent hydrocarbon group having 2 to 10 carbon atoms, and $R^2$ represents a monovalent hydrocarbon group having 1 to 30 carbon atoms; —X— represents —NH—, —N(CH$_3$)— or —(C=O)—; and m $R^1$'s in the general formula (I) may be the same or different, and $$—Y—R^3 \qquad (II)$$

wherein $R^3$ represents a monovalent hydrocarbon group having 1 to 30 carbon atoms; and —Y— in the general formula (II) represents —(C=O)— when X in the general formula (I) is —NH— or —N(CH₃)—, Y in the general formula (II) represents —NH— or —N(CH₃)— when X in the general formula (I) is —(C=O)—.

[2] The end modified polyamide resin according to [1], wherein the end modified polyamide resin contains 60 to 250 [mol/t] in total of the end structure represented by the general formula (I) and the end structure represented by the general formula (II), and the ratio ((I)/(II)) of the content [mol/t] of the end structure represented by the general formula (I) and the content [mol/t] of the end structure represented by the general formula (II) is 0.3 to 2.5.

[3] The end modified polyamide resin according to [1] or [2], wherein the end modified polyamide resin contains 50 to 150 [mol/t] in total of an amino end group and a carboxyl end group, and the ratio of the content [mol/t] of the amino end group and the content [mol/t] of the carboxyl end group (amino end group/carboxyl end group) is 0.5 to 2.5.

[4] The end modified polyamide resin according to any one of [1] to [3], wherein the relative viscosity (ηr) of a 98% sulfuric acid solution having a resin concentration of 0.01 g/ml is 1.3 to 3.0 at 25° C.

[5] The end modified polyamide resin according to any one of [1] to [4], wherein the weight average molecular weight Mw measured by gel permeation chromatography is 15,000 to 50,000.

[6] The end modified polyamide resin according to any one of [1] to [5], wherein the melt viscosity at a melting point+60° C. and a shear rate of 9728 sec⁻¹ is 30 Pa·s or less.

[7] The end modified polyamide resin according to any one of [1] to [6], wherein the content retention ((content after retention/content before retention)×100) of the end structure represented by the general formula (I) before and after retention for 60 minutes at a melting point+60° C. is 80% or more.

[8] The end modified polyamide resin according to any one of [1] to [7], wherein the weight average molecular weight retention ((weight average molecular weight after retention/weight average molecular weight before retention)×100) before and after retention for 60 minutes at a melting point+60° C. is 80% to 120%.

[9] The end modified polyamide resin according to any one of [1] to [8], wherein the melt viscosity retention ((melt viscosity after retention/melt viscosity before retention)×100) before and after retention for 60 minutes at a melting point+60° C. is 80% to 120%.

[10] The end modified polyamide resin according to any one of [1] to [9], wherein the mass reduction ratio before and after retention for 40 minutes under a nitrogen atmosphere at a melting point+60° C. is 4% or less.

[11] A method for producing the end modified polyamide resin according to anyone of [1] to [10], the method comprising adding, in polymerization of at least one selected from the group consisting of a combination of a diamine and a dicarboxylic acid, an amino acid and a lactam, 1 to 20% by mass of a terminal modification agent represented by general formula (III) below based on the total amount of the diamine, dicarboxylic acid, the amino acid and the lactam, and 0.01 to 5% by mass of a terminal modification agent represented by general formula (IV) below based on the total amount of the diamine, dicarboxylic acid, the amino acid and the lactam, to bond the terminal modification agents to the end of the polyamide resin:

     (III)

wherein m represents 2 to 100; R¹ represents a divalent hydrocarbon group having 2 to 10 carbon atoms, and R² represents a monovalent hydrocarbon group having 1 to 30 carbon atoms; —X'— represents —NH—, —N(CH₃)— or —O(C=O)—; and m R¹s in the general formula (III) may be the same or different, and

     (IV)

wherein R³ represents a monovalent hydrocarbon group having 1 to 30 carbon atoms; and
—Y— in the general formula (IV) represents —O(C=O)— when X' in the general formula (III) is —NH— or —N(CH₃)—, Y' in the general formula (IV) represents —NH— or —N(CH₃)— when X' in the general formula (III) is —O(C=O)—.

According to the present invention, it is possible to obtain an end modified polyamide resin which has an extremely low melt viscosity, and is excellent in melt fluidity, thermal stability at melt retention, molding processability and mechanical physical properties.

DETAILED DESCRIPTION OF EMBODIMENTS OF THE INVENTION

A polyamide resin of the present invention and a method for production thereof will now be described in detail.

The end modified polyamide resin in the present invention is a polyamide resin which can be obtained using at least one selected from an amino acid, a lactam and a "mixture of a diamine and a dicarboxylic acid" as a main raw material. The end modified polyamide resin has an end structure represented by the general formula (I), and an end structure represented by the general formula (II). In other words, the end modified polyamide resin in the present invention has an end structure represented by the general formula (I) and an end structure represented by the general formula (II) in polymerization performed using at least one selected from the group consisting of an amino acid, a lactam and a combination of a diamine and a dicarboxylic acid as a main raw material.

As a chemical structure that forms a main structural unit of the polyamide resin, one having 4 to 20 carbon atoms is preferable when an amino acid or a lactam is used as a raw material. When a diamine and a dicarboxylic acid are used as raw materials, the number of carbon atoms of the diamine is preferably in a range of 2 to 20, and the number of carbon atoms of the dicarboxylic acid is preferably in a range of 2 to 20. Typical examples of the raw material are as follows.

Specific examples include amino acids such as 6-aminocaproic acid, 11-aminoundecanoic acid, 12-aminododecanoic acid and paraaminomethylbenzoic acid; lactams such as ε-caprolactam, ω-undecane lactam and ω-laurolactam; aliphatic diamines such as ethylenediamine, trimethylenediamine, tetramethylenediamine, pentamethylenediamine, hexamethylenediamine, heptamethylenediamine, octamethylenediamine, nonamethylenediamine, decanediamine, undecanediamine, dodecanediamine, tridecanediamine, tetradecanediamine, pentadecanediamine, hexadecanediamine, heptadecanediamine, octadecanediamine, nonadecanediamine, eicosanediamine, 2-methyl-1,5-diaminopentane and 2-methyl-1,8-diaminooctane, cycloaliphatic diamines such as cyclohexanediamine, bis-(4-aminocyclohexyl)methane and bis(3-methyl-4-aminocyclohexyl)methane, and aromatic diamines such as xylylenediamine; and aliphatic dicarboxylic acids such as oxalic acid, malonic acid, succinic acid, glutaric acid, adipic acid, suberic acid, azelaic acid, sebacic acid, undecanedioic acid and dodecanedioic acid, aromatic dicarboxylic acids such as terephthalic acid, isophthalic acid, 2-chloroterephthalic acid, 2-methylterephthalic acid, 5-methylisophthalic acid, 5-sodiumsulfoisophthalic acid, hexahydroterephthalic acid and hexahydroisophthalic acid, cycloaliphatic dicarboxylic acids such as cyclohexanedicarboxylic acid, dialkyl esters, and dichlorides of the dicarboxylic acid.

In the present invention, a polyamide homopolymer or copolymer derived from a raw material as described above can be used as a polyamide resin into which an end structure is introduced. Two or more of such polyamides may be mixed to form a polyamide resin. In the present invention, from the viewpoint of further improving the mechanical characteristic and thermal stability at melt retention, the content of structural units derived from the raw material shown above is preferably 80 mol % or more, more preferably 90 mol % or more, still more preferably 100 mol % based on 100 mol % of all structural units that form the polyamide resin excluding the end structure represented by the general formula (I) and the end structure represented by the general formula (II). In addition, the polymeric structure derived from the raw material shown above is preferably linear.

The end modified polyamide resin of the present invention has an end structure represented by the following general formula (I). Since the end structure represented by the following general formula (I) has an alkylene oxide structure, the resulting polymer has high molecular mobility, and is excellent in affinity with an amide group. The structure situated at the end of the polyamide resin and represented by the following general formula (I) intervenes between polyamide molecular chains, so that the free volume of the polymer is increased, leading to reduction of entanglement. As a result, the molecular mobility of the polymer is considerably increased, so that the melt viscosity can be reduced (i.e. fluidity in melting can be further improved), resulting in improvement of molding processability. Such an effect is much higher as compared to a case where the polyamide resin mainly has a polyalkylene oxide structure in the main chain.

$$—X—(R^1—O)_m—R^2 \quad (I)$$

In the general formula (I), m represents 2 to 100 (2 or more and 100 or less). The effect of reducing the melt viscosity becomes insufficient as m decreases. m is preferably 5 or more, more preferably 8 or more, still more preferably 16 or more. On the other hand, when m is excessively large, heat resistance is insufficient. m is preferably 70 or less, more preferably 50 or less. From the viewpoint of maintaining characteristics derived from the main structural unit of the polyamide resin, it is preferable that the end modified polyamide resin in the present invention has the structure represented by the general formula (I) only at the end of the polymer.

In the general formula (I), $R^1$ represents a divalent hydrocarbon group having 2 to 10 (2 or more and 10 or less) carbon atoms. From the viewpoint of affinity with the main structural unit of the polyamide resin, $R^1$ is preferably a hydrocarbon group having 2 to 6 carbon atoms, more preferably a hydrocarbon group having 2 to 4 carbon atoms. From the viewpoint of thermal stability and discoloration prevention of the end modified polyamide resin, $R^1$ is still more preferably a saturated hydrocarbon group. Examples of $R^1$ include an ethylene group, a 1,3-trimethylene group, an isopropylene group, a 1,4-tetramethylene group, a 1,5-pentamethylene group and a 1,6-hexamethylene group, and m $R^1$s may form a combination of hydrocarbon groups having different numbers of carbon atoms. Preferably, $R^1$ includes at least a divalent saturated hydrocarbon group having 2 carbon atoms and a divalent saturated hydrocarbon group having 3 carbon atoms. More preferably, $R^1$ includes an ethylene group excellent in affinity with the main structural unit of the polyamide resin and an isopropylene group having a large free volume, so that the effect of reducing the melt viscosity can be more effectively exhibited. Here, it is preferable that the end structure represented by the general formula (I) contains 10 or more ethylene groups and 6 or less isopropylene groups, so that a nearly desired amount of end structures can be introduced into the polyamide resin, leading to further improvement of the melt viscosity reducing effect.

$R^2$ represents a monovalent hydrocarbon group having 1 to 30 (1 or more and 30 or less) carbon atoms. Affinity with the main structural unit of the polyamide resin is improved as the number of carbon atoms in $R^2$ decreases, and therefore $R^2$ is preferably a hydrocarbon group having 1 to 20 carbon atoms, more preferably a hydrocarbon group having 1 to 10 carbon atoms. In addition, from the viewpoint of thermal stability and discoloration prevention of the end modified polyamide resin, $R^2$ is more preferably a monovalent saturated hydrocarbon group. Examples of $R^2$ include a methyl group, an ethyl group, a propyl group, a butyl group, a pentyl group, a hexyl group, a heptyl group, an octyl group, a nonyl group and a decyl group. Among them, a methyl group and an ethyl group which are excellent in affinity with the main structural unit of the polyamide resin are more preferable.

In the general formula (I), —X— represents —NH—, —N(CH$_3$)— or —(C=O)—. Among them, —NH— which is excellent in affinity with the main structural unit of the polyamide resin is more preferable.

The end modified polyamide resin of the present invention has an end structure represented by the general formula (I) at least at one end of a polymer that forms the end modified polyamide resin.

The end modified polyamide resin of the present invention is required to contain 1 to 20% by mass (1% by mass or more and 20% by mass or less) of the end structure represented by the general formula (I), based on 100% by mass of the end modified polyamide resin. When the content of the end structure represented by the general formula (I) is less than 1% by mass, the melt viscosity of the end modified polyamide resin is not sufficiently reduced, and thus molding processability is deteriorated. The content of the end structure represented by the general formula (I) is more preferably 3% by mass or more, still more preferably 5% by mass or more. On the other hand, when the content of the end structure represented by the general formula (I) is more than 20% by mass, the amount of a gas component resulting from thermal decomposition of the structure represented by the general formula (I) increases at melt retention, leading to deterioration of thermal stability at melt retention. In addition, the molecular weight of the end modified polyamide resin cannot be set high, and therefore the mechanical characteristic is deteriorated. The content of the end structure represented by the general formula (I) is more preferably 15% by mass or less, still more preferably 10% by mass or less.

In the present invention, the content of the end structure represented by the general formula (I) in the end modified polyamide resin can be adjusted to fall within a desired range by, for example, adjusting the blending amount of the later-described terminal modification agent represented by the general formula (III), which is used in production of the end modified polyamide resin.

In addition, the end modified polyamide resin of the present invention has an end structure represented by the following general formula (II). By introducing the end structure represented by the general formula (I), the melt viscosity of the end modified polyamide resin can be reduced to improve molding processability as described above, but at long-term melt retention during molding processing or the like, thermal decomposition of the end structure represented by the general formula (I) proceeds, so that the melt viscosity reducing effect tends to be easily reduced. In particular, it has been found that the amino end group and the carboxyl end group of the polyamide resin act as a catalyst of thermal decomposition of the end structure represented by the general formula (I), and therefore by reducing the amount of the amino end group and the amount of the carboxyl end group in the polyamide resin, thermal decomposition of the end structure represented by the general formula (I) can be suppressed to further improve thermal stability at melt retention while maintaining the melt viscosity reducing effect by the end structure represented by the general formula (I). For example, when the later-described terminal modification agent represented by the general formula (III) is reacted with the carboxyl end group of a polyamide resin, it is possible to obtain a polyamide resin having only the end structure represented by the general formula (I). However, in the polyamide resin, one end is modified with the end structure represented by the general formula (I), but the other end is not modified, and remains as an amino end group or a carboxyl group. Thus, the amino end group or the carboxyl end group acts as a catalyst of thermal decomposition of the end structure represented by the general formula (I), so that thermal decomposition of the structure represented by the general formula (I) easily proceeds. Thus, for example, the later-described terminal modification agent represented by the general formula (IV) is reacted with the polyamide resin (i.e. a polyamide resin in which only one end is modified with the structure represented by the general formula (I)) to modify the other end, whereby a polyamide resin further having an end structure represented by the following general formula (II) can be obtained. By further introducing the end structure represented by the general formula (II) into the polyamide resin modified with the structure represented by the general formula (I), thermal decomposition of the structure represented by the general formula (I) can be suppressed to improve thermal stability at melt retention while maintaining the melt viscosity reducing effect.

  (II)

In the general formula (II), $R^3$ represents a monovalent hydrocarbon group having 1 or more and 30 or less carbon atoms. Affinity with the main structural unit of the polyamide resin is improved as the number of carbon atoms in $R^3$ decreases, and therefore $R^3$ is preferably a hydrocarbon group having 1 to 30 carbon atoms. Specific examples of $R^3$ include linear alkyl groups such as a methyl group, an ethyl group, a propyl group, a butyl group, a pentyl group, a hexyl group, a heptyl group, an octyl group, a nonyl group, a decyl group, an undecyl group, a tridecyl group, a tetradecyl group, a pentadecyl group, a hexadecyl group, a heptadecyl group, an octadecyl group, a nonadecyl group, an icosyl group, an eicosyl group, a henicosyl group, a heneicosyl group, a docosyl group, a tricosyl group, a tetracosyl group, a pentacosyl group, a hexacosyl group, a heptacosyl group, an octacosyl group, a nonacosyl group and a triacontyl group; branched alkyl groups such as an isopropyl group, an isobutyl group, a tert-butyl group, an isopentyl group and a neopentyl group; cycloalkyl groups such as a cyclopentyl group, a cyclohexyl group and a cycloheptyl group; aryl groups such as a phenyl group and a tolyl group; and aralkyl groups such as a benzyl group and a 2-phenylethyl group. From the viewpoint of thermal stability and discoloration prevention of the end modified polyamide resin, $R^3$ is more preferably a monovalent saturated hydrocarbon group having 1 or more and 20 or less carbon atoms, or an aryl group.

—Y— in the general formula (II) represents —(C=O)— when X in the general formula (I) is —NH— or —N(CH$_3$) Y in the general formula (II) represents —NH— or —N(CH$_3$)— when X in the general formula (I) is —(C=O)—.

Normally, one end group of a polyamide resin in which either of both ends is not modified is an amino end group, and the other end group is a carboxyl end group. Here, when the terminal modification agent represented by the general formula (III) has an amino end group, the terminal modification agent reacts with the carboxyl end group of the polyamide resin, so that X in the general formula (I) is —NH— or —N(CH$_3$)—. Here, by reacting the amino end group as the other end of the polyamide resin with the terminal modification agent represented by the general formula (IV), the end structure represented by the general formula (II) can be introduced to the other end of the polyamide resin. Here, Y in the general formula (II) is —(C=O)—.

On the other hand, when the terminal modification agent represented by the general formula (III) has a carboxyl end group, the terminal modification agent reacts with the amino end group of the polyamide resin, so that X in the general formula (I) is —(C=O)—. Here, by reacting the carboxyl end group as the other end of the polyamide resin with the terminal modification agent represented by the general formula (IV), the end structure represented by the general formula (II) can be introduced to the other end of the polyamide resin. Y in the general formula (II) is —NH— or —N(CH$_3$)—.

The end modified polyamide resin of the present invention is required to contain 0.1 to 5% by mass (0.1% by mass or more and 5% by mass or less) of the end structure represented by the general formula (II), based on 100% by mass of the end modified polyamide resin. When the content of the end structure represented by the general formula (II) is less than 0.1% by mass, thermal decomposition of the structure represented by the general formula (I) in the end modified polyamide resin proceeds at melt retention, leading to deterioration of thermal stability at melt retention. Mechanical physical properties are also deteriorated. The content of the end structure represented by the general formula (II) is more preferably 0.2% by mass or more, still more preferably 0.4% by mass or more. On the other hand, when the content of the end structure represented by the general formula (II) is more than 5% by mass, the mechanical characteristic and thermal stability are deteriorated. The content of the end structure represented by the general formula (II) is more preferably 3% by mass or less, still more preferably 1% by mass or less.

In the present invention, the content of the end structure represented by the general formula (II) in the end modified polyamide resin can be adjusted to fall within a desired range by, for example, adjusting the blending amount of the later-described terminal modification agent represented by the general formula (IV), which is used in production of the end modified polyamide resin.

Preferably, the end modified polyamide resin in the present invention includes a polyamide resin having an end structure represented by the general formula (I) and an end structure represented by the general formula (II) (i.e. a polyamide resin in which one end is modified with the end structure represented by the general formula (I), and the other end is modified with the end structure represented by the general formula (II)). The end modified polyamide resin may include a polyamide resin having only the end structure represented by the general formula (I) (e.g. a polyamide resin in which one end is modified with the end structure represented by the general formula (I), and the other end is not modified) and a polyamide resin having only the end structure represented by the general formula (II) (e.g. a polyamide resin in which one end is modified with the end structure represented by the general formula (II), and the other end is not modified).

In addition, in the end modified polyamide resin of the present invention, the total of the content [mol/t] of the end structure represented by the general formula (I) and the content [mol/t] of the end structure represented by the general formula (II) is preferably 60 to 250 mol/t (60 mol/t or more and 250 mol/t or less). When the end structure represented by the general formula (I) and the end structure represented by the general formula (II) are contained in a total amount of 60 mol or more based on 1 t of the end modified polyamide resin, the melt viscosity of the end modified polyamide resin can be further reduced to further improve molding processability, and thermal stability at melt retention can be further improved. The total content of these end structures is more preferably 70 mol/t or more, still more preferably 80 mol/t or more.

On the other hand, when the end structure represented by the general formula (I) and the end structure represented by the general formula (II) are contained in a total amount of 250 mol or less based on 1 t of the end modified polyamide resin, the mechanical characteristic and thermal stability at melt retention can be further improved. The total content of these end structures is more preferably 225 mol/t or less, still more preferably 200 mol/t or less.

In the present invention, the total amount of the end structure represented by the general formula (I) and the end structure represented by the general formula (II) in the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin.

Further, in the end modified polyamide resin of the present invention, the ratio ((I)/(II)) of the content [mol/t] of the end structure represented by the general formula (I) to the content [mol/t] of the end structure represented by the general formula (II) is preferably 0.3 to 2.5 (0.3 or more and 2.5 or less). In the polyamide resin, the molecular weight is increased by a polymerization reaction of the amino end group and the carboxyl end group concurrently with reduction of the molecular weight by thermal decomposition at melt retention. The difference between the amounts of the modified (blocked) amino end group and carboxyl end group increases as the molar ratio ((I)/(II)) becomes further from 1, and as the difference increases, the polymerization reaction at melt retention less easily proceeds, so that molecular weight reduction resulting from thermal decomposition becomes larger, and therefore the melt viscosity at melt retention, and molecular weight reduction tend to increase. In addition, as the above-mentioned difference increases, the polymerization reaction less easily proceeds at melt retention, so that end groups (amino end group and carboxyl end group) are not consumed in the polymerization reaction.

Therefore, as described above, these end groups act as a catalyst of thermal decomposition of the end structure represented by the general formula (I), and accelerate thermal decomposition of the alkylene oxide structure in the end structure represented by the general formula (I), so that the melt viscosity tends to increase.

When the molar ratio ((I)/(II)) is 0.3 or more, the melt viscosity of the end modified polyamide resin can be further reduced to further improve molding processability, and thermal decomposition of the structure represented by the general formula (I) in the end modified polyamide resin at melt retention can be further suppressed to further improve thermal stability. The molar ratio ((I)/(II)) is more preferably 0.5 or more, still more preferably 0.6 or more, most preferably 0.8 or more. When the molar ratio ((I)/(II)) is 2.5 or less, thermal decomposition of the end structure represented by the general formula (I) in the end modified polyamide resin at melt retention can be further suppressed to further improve thermal stability. The molar ratio ((I)/(II)) is more preferably 2.2 or less, still more preferably 2.0 or less.

Here, the content each of the end-structure represented by the general formula (I) and the end structure represented by the general formula (II) in the end modified polyamide resin can be determined by $^1$H-NMR measurement. Measurement and calculation methods are as follows.

First, a deuterated sulfuric acid solution or deuterated hexafluoroisopropanol solution having a polyamide resin (A) concentration of 50 mg/mL is prepared, and $^1$H-NMR measurement is performed with a cumulative number of 256. From the spectral integral value of $R^1$, the spectral integral value of $R^2$, the spectral integral value of $R^3$, and the spectral integral value of the repeating structural unit of the polyamide resin skeleton (repeating structural unit forming a main chain of a polymer), the content (% by mass or mol/t) of each end structure and the ratio (sometimes referred to as a "molar ratio") of the content (mol/t) of the end structure (I) to the content (mol/t) of the end structure (II) can be calculated.

In the present invention, the molar ratio ((I)/(II)) in the end modified polyamide resin can be adjusted to fall within a desired range by, for example, the blending ratio of the later-described terminal modification agent represented by the general formula (III) and terminal modification agent represented by the general formula (IV), which are used in production of the end modified polyamide resin.

Preferably, the end modified polyamide resin of the present invention contains an amino end group and a carboxyl end group in a total amount of 50 to 150 mol/t (50 mol/t or more and 150 mol/t or less). When these end groups are contained in a total amount of 50 mol or more based on 1 t of the end modified polyamide resin, a reduction in molecular weight retention at melt retention can be further suppressed to further improve thermal stability. The total content of these end groups is more preferably 60 mol/t or more, still more preferably 80 mol/t or more.

On the other hand, when the end modified polyamide resin contains an amino end group and a carboxyl end group in a total amount of 150 mol/t or less, thermal decomposition of the structure represented by the general formula (I) in the end modified polyamide resin at melt retention, and an increase in molecular weight can be further suppressed to further improve thermal stability. The total content of these end groups is more preferably 135 mol/t or less, still more preferably 120 mol/t or less.

Further, in the end modified polyamide resin of the present invention, the ratio of the content [mol/t] of the amino end group to the content [mol/t] of the carboxyl end group (content of amino end group/content of carboxyl end group) is preferably 0.5 to 2.5 (0.5 or more and 2.5 or less). As the difference between the amounts of the amino end group and carboxyl end group increases, polymerization at melt retention less easily proceeds, so that molecular weight reduction resulting from thermal decomposition becomes larger, and therefore the melt viscosity at melt retention, and molecular weight reduction tend to increase as described above. In addition, polymerization less easily proceeds at melt retention, so that end groups (amino end group and carboxyl end group) are not consumed in the polymerization reaction. Therefore, as described above, these end groups act as a catalyst of thermal decomposition of the structure represented by the general formula (I), and accelerate thermal decomposition of the alkylene oxide structure in the end structure represented by the general formula (I), so that the melt viscosity tends to increase.

When the above-mentioned molar ratio (amino end group/carboxyl end group) is 0.5 or more, thermal decomposition of the structure represented by the general formula (I) in the end modified polyamide resin at melt retention, and a reduction in molecular weight can be further suppressed to further improve thermal stability. The molar ratio (amino end group/carboxyl end group) is more preferably 0.6 or more, still more preferably 0.8 or more. On the other hand, when the molar ratio (amino end group/carboxyl end group) is 2.5 or less, thermal decomposition of the structure represented by the general formula (I) in the end modified polyamide resin at melt retention can be further suppressed to further improve thermal stability and mechanical physical properties. In addition, the gas generation amount can be reduced. The molar ratio (content of amino end group/content of carboxyl end group) is more preferably 2.4 or less, still more preferably 2.3 or less.

Here, the content of the amino end group in the end modified polyamide resin can be measured by dissolving the end modified polyamide resin in a phenol/ethanol mixed solution (ratio: 83.5/16.5 in terms of a mass ratio), and titrating the resulting solution with a hydrochloric acid aqueous solution using thymol blue as an indicator. In addition, the content of the carboxyl end group in the end modified polyamide resin can be measured by dissolving the end modified polyamide resin in benzyl alcohol at a temperature of 195° C., and titrating the resulting solution with a solution of potassium hydroxide in ethanol using phenolphthalein as an indicator.

In the present invention, the total or ratio of the content of the amino end group and the content of the carboxyl end group in the end modified polyamide resin can be adjusted to fall within a desired range by, for example, adjusting the blending ratio of the later-described terminal modification agent represented by the general formula (III) and terminal modification agent represented by the general formula (IV), which are used in production of the end modified polyamide resin, or the reaction time.

The melting point (Tm) of the end modified polyamide resin of the present invention is preferably 200° C. or higher. Here, the melting point of the end modified polyamide resin can be determined by differential scanning calorimetry (DSC). A measurement method is as follows. 5 to 7 mg of the end modified polyamide resin is weighed. In a nitrogen atmosphere, the temperature is elevated from 20° C. to Tm+30° C. at a temperature elevation rate of 20° C./min. Subsequently, the temperature is decreased to 20° C. at a cooling rate of 20° C./min. The temperature at the top of an endothermic peak appearing at the time of elevating the temperature again from 20° C. to Tm+30° C. at a temperature elevation rate of 20° C./min is defined as a melting point (Tm).

Examples of the end modified polyamide resin having a melting point of 200° C. or higher include the following polyamides and copolymers thereof, which have, at the ends thereof, the structure represented by the general formula (I) and the structure represented by the general formula (II). Two or more of these polymers may be used depending on required characteristics such as heat resistance, toughness and surface properties. Examples of the polyamide include polycaproamide (polyamide 6), polyundecaneamide (polyamide 11), polydodecaneamide (polyamide 12), polyhexamethylene adipamide (polyamide 66), polytetramethylene adipamide (polyamide 46), polypentamethylene adipamide (polyamide 56), polytetramethylene sebacamide (polyamide 410), polypentamethylene sebacamide (polyamide 510), polyhexamethylene sebacamide (polyamide 610), polyhexamethylene dodecamide (polyamide 612), polydecamethylene sebacamide (nylon 1010), polydecamethylene dodecamide (nylon 1012), polymethaxylylene adipamide (MXD 6), polymethaxylylene sebacamide (MXD 10), polyparaxylylene sebacamide (PXD 10), polynonamethylene terephthalamide (nylon 9T), polydecamethylene terephthalamide (polyamide 10T), polyundecamethylene terephthalamide (polyamide 11T), polydodecamethylene terephthalamide (polyamide 12T), polypentamethylene terephthalamide/polyhexamethylene terephthalamide copolymer (polyamide 5T/6T), poly-2-methylpentamethylene terephthalamide/polyhexamethylene terephthalamide (polyamide M5T/6T), polyhexamethylene adipamide/polyhexamethylene terephthalamide copolymer (polyamide 66/6T), polyhexamethylene adipamide/polyhexamethylene isophthalamide copolymer (polyamide 66/6I), polyhexamethylene adipamide/polyhexamethylene terephthalamide/polyhexamethylene isophthalamide (polyamide 66/6T/6I), polybis(3-methyl-4-aminocyclohexyl)methane terephthalamide (polyamide MACMT), polybis(3-methyl-4-aminocyclohexyl)methane isophthalamide (polyamide MACMI), polybis(3-methyl-4-aminocyclohexyl)methanedodecamide (polyamide MACM 12), polybis(4-aminocyclohexyl)methane terephthalamide (polyamide PACMT), polybis(4-aminocyclohexyl)methane isophthalamide (polyamide PACMI) and polybis(4-aminocyclohexyl)methane dodecamide (polyamide PACM 12).

Especially preferred examples may include polyamide 6, polyamide 66, polyamide 56, polyamide 410, polyamide 510, polyamide 610, polyamide 6/66, polyamide 6/12, polyamide 9T and polyamide 10T, which have, at the ends thereof, the structure represented by the general formula (I) and the structure represented by the general formula (II).

In the end modified polyamide resin of the present invention, the relative viscosity ($\eta r$) of a 98% sulfuric acid solution having a resin concentration of 0.01 g/ml is preferably 1.3 to 3.0 (1.3 or more and 3.0 or less) at 25° C. When the relative viscosity ($\eta r$) is 1.3 or more, toughness can be improved. The relative viscosity ($\eta r$) is preferably 1.4 or more, more preferably 1.5 or more. On the other hand, when the relative viscosity ($\eta r$) is 3.0 or less, molding processability can be further improved. The relative viscosity ($\eta r$) is preferably 2.5 or less, more preferably 2.1 or less. The relative viscosity ($\eta r$) is still more preferably 2.05 or less, most preferably 2.0 or less.

In the present invention, the relative viscosity of the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin, or the reaction time.

The weight average molecular weight (Mw) of the end modified polyamide resin of the present invention, which is measured by gel permeation chromatography (GPC), is preferably 15,000 or more. When the weight average molecular weight (Mw) is 15,000 or more, the mechanical characteristic can be further improved. The weight average molecular weight (Mw) is more preferably 18,000 or more, still more preferably 20,000 or more. In addition, the weight average molecular weight (Mw) is preferably 50,000 or less. When the weight average molecular weight (Mw) is 50,000 or less, the melt viscosity can be further reduced to further improve molding processability. The weight average molecular weight (Mw) is more preferably 45,000 or less, still more preferably 40,000 or less. The weight average molecular weight (Mw) in the present invention is determined by performing GPC measurement at a temperature of 30° C. using hexafluoroisopropanol (containing 0.005 N sodium trifluoroacetate) as a solvent and using Shodex HFIP-806 M (2 pieces) and HFIP-LG as columns. Polymethyl methacrylate is used as a molecular weight standard.

In the present invention, the weight average molecular weight of the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin, or the reaction time.

The melt viscosity of end modified polyamide resin of the present invention at a melting point+60° C. and a shear rate of 9728 sec$^{-1}$ is preferably 30 Pa·s or less. When the melt viscosity at a melting point+60° C. and a shear rate of 9728 sec$^{-1}$ is 30 Pa·s or less, molding processability can be further improved. The melt viscosity is more preferably 20 Pa·s or less, still more preferably 15 Pa·s or less, still more preferably 10 Pa·s or less. On the other hand, from the viewpoint of a handling characteristic, the melt viscosity is more preferably 0.1 Pa·s or more, still more preferably 0.5 Pa·s or more, most preferably 1.0 Pa·s or more.

The melt viscosity can be measured by a capillary flow meter at a shear rate of 9728 sec$^{-1}$ after retention of the end modified polyamide resin for 5 minutes at a temperature higher by 60° C. than the melting point of the end modified polyamide resin for melting the end modified polyamide resin. As an index for evaluation of the melt viscosity in the present invention, a temperature higher by 60° C. than the melting point is selected as a temperature condition which ensures that a melting and well-fluidizing effect is easily exhibited and thermal decomposition hardly proceeds in short-time retention, and a shear rate of 9728 sec$^{-1}$ is selected as a high shear condition that is intended to form a small, complicated, thin and lightweight molded article.

In the present invention, the melt viscosity of the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin, or the reaction time.

In the end modified polyamide resin of the present invention, the content retention ((content after retention/content before retention)×100) of the end structure represented by the general formula (I) before and after retention for 60 minutes at a melting point+60° C. is preferably 80% or more. When the content retention of the end structure represented by the general formula (I) is 80% or more, the amount of a gas generated at melt retention by thermal decomposition of the end structure represented by the general formula (I) in the end modified polyamide resin can be further reduced, so that thermal stability at melt retention can be further improved. The content retention of the end structure represented by the general formula (I) is more preferably 85% or more, still more preferably 90% or more. In addition, from the viewpoint of having both molding processability and a mechanical characteristic, the content retention of the end structure represented by the general formula (I) is preferably 100% or less.

The content retention can be calculated in the following manner: the content of the end structure represented by the general formula (I) in the end modified polyamide resin is determined by the above-mentioned $^1$H-NMR measurement, the end modified polyamide resin is then retained for 60 minutes at a temperature higher by 60° C. than the melting point of the end modified polyamide resin in a capillary flow meter, the content of the end structure represented by the general formula (I) is then determined in the same manner as described above, and is divided by the content of the end structure represented by the general formula (I) before the melt retention, and the resulting value is multiplied by 100. As an index for evaluation of the melt viscosity in the present invention, a temperature higher by 60° C. than the melting point is selected as a temperature condition which ensures that a melting and well-fluidizing effect is easily exhibited and thermal decomposition hardly proceeds in short-time retention.

In the present invention, the content retention of the end structure represented by the general formula (I) in the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin, or the reaction time.

In the end modified polyamide resin of the present invention, the weight average molecular weight retention ((weight average molecular weight after retention/weight average molecular weight before retention)×100) before and after retention for 60 minutes at a melting point+60° C. is preferably 80% to 120% (80% or more and 120% or less). When the above-mentioned weight average molecular weight retention is 80% or more, the mechanical characteristic can be further improved. The weight average molecular weight retention is more preferably 85% or more, still more preferably 90% or more. On the other hand, when the weight average molecular weight retention is 120% or less, melt fluidity can be further improved to further improve molding processability. The weight average molecular weight retention is more preferably 115% or less, still more preferably 110% or less.

The weight average molecular weight retention can be calculated in the following manner: the weight average molecular weight of the end modified polyamide resin is measured by the above-mentioned gel permeation chromatography (GPC), the end modified polyamide resin is then retained for 60 minutes at a temperature higher by 60° C. than the melting point of the end modified polyamide resin in a capillary flow meter, the weight average molecular weight is then measured in the same manner as described above, and is divided by the weight average molecular weight before the melt retention, and the resulting value is multiplied by 100. As an index for evaluation of the melt viscosity in the present invention, a temperature higher by 60° C. than the melting point is selected as a temperature condition which ensures that a melting and well-fluidizing effect is easily exhibited and thermal decomposition hardly proceeds in short-time retention.

In the present invention, the weight average molecular weight retention of the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin, or the reaction time.

In the end modified polyamide resin of the present invention, the melt viscosity retention ((melt viscosity after retention/melt viscosity before retention)×100) before and after retention for 60 minutes at a melting point+60° C. is preferably 80% to 120% (80% or more and 120% or less). When the melt viscosity retention is 80% or more, molding processability and the mechanical characteristic can be further improved. The melt viscosity retention is more preferably 85% or more, still more preferably 90% or more, still more preferably 95% or more. On the other hand, when the melt viscosity retention is 120% or less, molding processability can be further improved. The melt viscosity retention is more preferably 115% or less, still more preferably 110% or less.

The melt viscosity retention can be calculated by (melt viscosity after retention/melt viscosity before retention)× 100 from the melt viscosity (melt viscosity before retention) measured by a capillary flow meter at a shear rate of 9728 sec$^{-1}$ after retention of the end modified polyamide resin for 5 minutes at a temperature higher by 60° C. than the melting point of the end modified polyamide resin for melting the end modified polyamide resin and the melt viscosity (melt viscosity after retention) measured by a capillary flow meter at a shear rate of 9728 sec$^{-1}$ after retention of the end modified polyamide resin for 60 minutes at a temperature higher by 60° C. than the melting point of the end modified polyamide resin for melting the end modified polyamide resin. As an index for evaluation of the melt viscosity retention in the present invention, a temperature higher by 60° C. than the melting point is selected as a temperature condition which ensures that a melting and well-fluidizing effect is easily exhibited and thermal decomposition hardly proceeds in short-time retention, and a shear rate of 9728 sec$^{-1}$ is selected as a high shear condition that is intended to form a small, complicated, thin and lightweight molded article.

In the present invention, the melt viscosity retention of the end modified polyamide resin can be adjusted to fall within a desired range by, for example, adjusting the blending amounts of the later-described terminal modification agent represented by the general formula (III) and terminal modification agent represented by the general formula (IV), which are used in production of the end modified polyamide resin, or the reaction time.

In the end modified polyamide resin of the present invention, the mass reduction ratio before and after retention for 40 minutes under a nitrogen atmosphere at a melting point+ 60° C. is preferably 4% or less. When the above-mentioned mass reduction ratio is 4% or less, voids etc. in a molded article, which result from a gas generated by thermal decomposition during molding processing, can be suppressed, so that the mechanical characteristic can be further improved. The mass reduction ratio is more preferably 3% or less, still more preferably 2% or less.

The mass reduction ratio can be measured using a thermogravimetric analysis apparatus (TGA). As an index for evaluation of the mass reduction ratio in the present invention, a temperature higher by 60° C. than the melting point is selected as a temperature condition which ensures that a melting and well-fluidizing effect is easily exhibited and thermal decomposition hardly proceeds in short-time retention.

In the present invention, the mass reduction ratio of the end modified polyamide resin can be adjusted to fall within a desired range by, for example, the blending amounts of the later-described terminal modification agent represented by the general formula (III) and terminal modification agent represented by the general formula (IV), which are used in production of the end modified polyamide resin, or the reaction time.

A method for producing the end modified polyamide resin of the present invention will now be described.

Examples of the method for producing the end modified polyamide resin of the present invention include:
(1) a method in which a polyamide resin, a terminal modification agent, and other components as necessary are melted and kneaded at a temperature equal to or higher than the melting point of the polyamide resin, and reacted, or are mixed in a solution, and reacted, followed by removing the solvent; and
(2) a method of adding a raw material that forms a main structural unit of a polyamide resin, a terminal modification agent, and other components as necessary are added, and the mixture is reacted (method of addition at reaction).

Examples of the terminal modification agent in the present invention include a terminal modification agent represented by the following general formula (III).

$$H—X'—(R^1—O)_m—R^2 \qquad (III)$$

wherein m represents 2 to 100; As with m in the general formula (I), m is preferably 5 or more, more preferably 8 or more, still more preferably 16 or more. On the other hand, m is preferably 70 or less, more preferably 50 or less. $R^1$ represents a divalent hydrocarbon group having 2 to 10 carbon atoms, and $R^2$ represents a monovalent hydrocarbon group having 1 to 30 carbon atoms. Examples of $R^1$ and $R^2$ include those shown as $R^1$ and $R^2$, respectively, in the general formula (I). X'— represents —NH—, —N(CH$_3$)— or —O(C=O)—. —NH— which is excellent in reactivity with the end of the polyamide is more preferable.

$$H—Y'—R^3 \qquad (IV)$$

wherein $R^3$ represents a monovalent hydrocarbon group having 1 to 30 carbon atoms; and As with the general formula (II), $R^3$ is more preferably a monovalent saturated hydrocarbon group from the viewpoint of thermal stability and discoloration prevention of the end modified polyamide resin. —Y— in the general formula (IV) represents —O(C=O)— when X' in the general formula (III) is —NH— or —N(CH$_3$)—, Y' in the general formula (IV) represents —NH— or —N(CH$_3$)— when X' in the general formula (III) is —O(C=O)—.

The number average molecular weight of the terminal modification agent represented by formula (III) is preferably 500 to 10000. When the number average molecular weight is 500 or more, the melt viscosity can be further reduced. The number average molecular weight is more preferably 800 or more, still more preferably 900 or more. On the other hand, when the number average molecular weight is 10000 or less, affinity with the main structural unit of the polyamide resin can be further improved. The number average molecular weight is more preferably 5000 or less, still more preferably 2500 or less, still more preferably 1500 or less.

Specific examples of the terminal modification agent represented by the general formula (III) include methoxy poly(ethylene glycol)amine, methoxy poly(trimethylene glycol)amine, methoxy poly(propylene glycol)amine, methoxy poly(tetramethylene glycol)amine, methoxy poly (ethylene glycol)poly(propylene glycol)amine, methoxy poly(ethylene glycol) carboxylic acid, methoxy poly(trimethylene glycol) carboxylic acid, methoxy poly(propylene glycol) carboxylic acid, methoxy poly(tetramethylene glycol) carboxylic acid and methoxy poly(ethylene glycol)poly (propylene glycol) carboxylic acid. When the terminal modification agent include two polyalkylene glycols, the terminal modification agent may have a block polymer structure or a random copolymer structure. Two or more of the above-mentioned terminal modification agents may be used.

Examples of the terminal modification agent in the present invention include a terminal modification agent represented by the following general formula (IV). Specific examples of the terminal modification agent represented by the general formula (IV) include aliphatic monocarboxylic acids such as acetic acid, propionic acid, butyric acid, valeric acid, caproic acid, enanthic acid, caprylic acid, pelargonic acid, undecanoic acid, lauric acid, tridecanoic acid, myristic acid, myristoleic acid, palmitic acid, stearic acid, oleic acid, linoleic acid, arachic acid and cerotic acid; cycloaliphatic monocarboxylic acids such as cyclohexanecarboxylic acid and methylcyclohexanecarboxylic acid; aromatic monocarboxylic acids such as benzoic acid, toluic acid, ethylbenzoic acid and phenylacetic acid; aliphatic monoamines such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, nonadecylamine and icosylamine; cycloaliphatic monoamines such as cyclohexylamine and methylcyclohexylamine; and aromatic monoamines such as benzylamine and β-phenylethylamine. Two or more of the above-mentioned terminal modification agents can also be used.

An example of a method for obtaining the end modified polyamide resin of the present invention, which has the end structure represented by the general formula (I) and the end structure represented by the general formula (II), will now be described. The methods (1) and (2), which have been described above, will be described more in detail below.

(1) When an end modified polyamide resin is produced by melting and kneading a polyamide resin and a terminal modification agent, it is preferable to carry out a reaction at a temperature higher than the melting point (Tm) of the polyamide resin by 10° C. or more and 40° C. or less. For example, when the polyamide resin and terminal modification agent are melted and kneaded using an extruder, it is preferable that the cylinder temperature of the extruder is within the above-mentioned range. When the melting and kneading temperature is within this range, the end of the polyamide resin and the terminal modification agent can be efficiently bonded to each other while volatilization of the terminal modification agent and decomposition of the polyamide resin are suppressed. The polyamide resin is, for example, the above-mentioned polyamide resin.

(2) When an end modified polyamide resin is produced by a method in which a raw material of a polyamide resin is reacted with a terminal modification agent during polymerization, either a melt polymerization method including carrying out a reaction at a temperature equal to or higher than the melting point of the polyamide resin or a solid phase polymerization method including carrying out a reaction at a temperature lower than the melting point of the polyamide resin may be used. Examples of the raw material that gives the polyamide resin include the above-described amino acid, lactam and "mixture of a diamine and a dicarboxylic acid".

Specifically, it is preferable that a raw material of the end modified polyamide resin is added in a reaction vessel, purged with nitrogen, and heated to be reacted. When the reaction time here is excessively short, mechanical physical properties may be deteriorated because not only the molecular weight is not increased, but also the amount of an oligomer component increases. Thus, the nitrogen flow time in the reaction time is preferably 15 minutes or more. On the other hand, when the reaction time is excessively long, thermal decomposition proceeds, so that coloring or the like occurs, and therefore the nitrogen flow time in the reaction time is preferably 8 hours or less.

A polymerization accelerator can be added as necessary in production of the end modified polyamide resin by a method in which a raw material of a polyamide resin is reacted with a terminal modification agent during polymerization. As the polymerization accelerator, for example, inorganic phosphorus compounds such as phosphoric acid, phosphorous acid, hypophosphorous acid, pyrophosphoric acid, polyphosphoric acid, and alkali metal salts and alkaline earth metal salts thereof are preferable, and in particular, sodium phosphite and sodium hypophosphite are preferably used. Preferably, the polymerization accelerator is used in an amount of 0.001 to 1 part by mass based on 100 parts by mass of the raw material of the polyamide resin (excluding the terminal modification agent). When the addition amount of the polymerization accelerator is 0.001 to 1 part by mass, it is possible to obtain an end modified polyamide resin that is further excellent in balance between the mechanical characteristic and molding processability.

A polyamide resin composition containing an end modified polyamide resin can be obtained by blending a filler, other type of polymer, various kinds of additives and the like in the end modified polyamide resin of the present invention.

As the filler, any filler that is generally used as a filler for resin can be used, and the strength, rigidity, heat resistance and dimensional stability of a molded article obtained from the polyamide resin composition can be further improved. Examples of the filler include fibrous inorganic fillers such as glass fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers and metal fibers; and nonfibrous inorganic fillers such as wollastonite, zeolite, sericite, kaolin, mica, talc, clay, pyrophyllite, bentonite, montmorillonite, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide and silica. The polyamide resin composition may contain two or more of these fillers. These fillers may be hollow. The filler may be treated with a coupling agent such as an isocyanate-based compound, an organosilane-based compound, an organic titanate-based compound, an organoborane-based compound or an epoxy compound. Organized montmorillonite obtained by cation-exchanging interlayer ions with an organic ammonium salt may be used as montmorillonite. Among the fillers, fibrous inorganic fillers are preferable, with glass fibers and carbon fibers being more preferable.

Examples of the other type of polymer may include polyolefins such as polyethylene and polypropylene, elastomers such as polyamide-based elastomers and polyester-based elastomers, polyester, polycarbonate, polyphenylene ether, polyphenylene sulfide, liquid crystal polymers, polysulfone, polyether sulfone, ABS resins, SAN resins and polystyrene. The polyamide resin composition may contain two or more of these fillers. For improving the impact resistance of a molded article obtained from the polyamide resin composition, an impact resistance improver such as a modified polyolefin such as a (co)polymer of an olefin-based compound and/or a conjugated diene-based compound, a polyamide-based elastomer or a polyester-based elastomer is preferably used.

Examples of the (co)polymer of an olefin-based compound and/or a conjugated diene-based compound include ethylene-based copolymers, conjugated diene-based polymers and conjugated diene-aromatic vinyl hydrocarbon-based copolymers.

Examples of the ethylene-based copolymer include copolymers of ethylene with an α-olefin having 3 or more carbon atoms, a non-conjugated diene, vinyl acetate, vinyl alcohol, and an α,β-unsaturated carboxylic acid and a derivative thereof. Examples of the α-olefin having 3 or more carbon atoms include propylene and butene-1. Examples of the non-conjugated diene include 5-methylidene-2-norbornene, 5-ethylidene-2-norbornene, dicyclopentadiene and 1,4-hexadiene. Examples of the α,β-unsaturated carboxylic acid include acrylic acid, methacrylic acid, ethacrylic acid, crotonic acid, maleic acid, fumaric acid, itaconic acid, citraconic acid and butenedicarboxylic acid. Examples of the derivative of α,β-unsaturated carboxylic acids include alkyl esters, aryl esters, glycidyl esters, acid anhydrides and imides of the above-mentioned α,β-unsaturated carboxylic acids.

The conjugated diene-based polymer refers to a polymer of at least one conjugated diene. Examples of the conjugated diene include 1,3-butadiene, isoprene (2-methyl-1,3-butadiene), 2,3-dimethyl-1,3-butadiene and 1,3-pentadiene. In addition, some or all of unsaturated bonds in such the polymer may be reduced by hydrogenation.

The conjugated diene-aromatic vinyl hydrocarbon-based copolymer refers to a copolymer of a conjugated diene and an aromatic vinyl hydrocarbon, and may be a block copolymer or a random copolymer. Examples of the conjugated diene include 1,3-butadiene and isoprene. Examples of the aromatic vinyl hydrocarbon include styrene. In addition, some or all of unsaturated bonds other than double bonds other than aromatic rings in the conjugated diene-aromatic vinyl hydrocarbon-based copolymer may be reduced by hydrogenation.

Specific examples of the impact resistance improver include ethylene/methacrylic acid copolymers, and ethylene/methacrylic acid copolymers salts in which some or all of carboxylic acid moieties form salts with sodium, lithium, potassium, zinc or calcium; ethylene/propylene-g-maleic anhydride copolymers; and ethylene/butene-1-g-maleic anhydride copolymers.

Examples of the various kinds of additives include antioxidants and heat stabilizers (hindered phenol-based agents, hydroquinone-based agents, phosphite-based agents, substituted products thereof, copper halides, iodine compounds and the like); weathering agents (resorcinol-based agents, salicylate-based agents, benzotriazole-based agents, benzophenone-based agents, hindered amine-based agents and the like); mold release agents and lubricants (aliphatic alcohols, aliphatic amides, aliphatic bis-amides, bis-urea, polyethylene wax and the like); pigments (cadmium sulfide, phthalocyanine, carbon black and the like); dyes (nigrosine, aniline black and the like); plasticizers (p-oxybenzoic acid octyl, N-butylbenzenesulfonamide and the like); antistatic agents (alkyl sulfate-type anion-based antistatic agents, quaternary ammonium salt-type cation-based antistatic agents, nonionic antistatic agents such as polyoxyethylene sorbitan monostearate, betaine-based amphoteric antistatic agents and the like); and flame retardants (melamine cyanurate, hydroxides such as magnesium hydroxide and aluminum hydroxide, ammonium polyphosphate, brominated polystyrene, brominated polyphenylene oxide, brominated polycarbonate, brominated epoxy resins, combinations of these bromine-based flame retardants and antimony trioxide, and the like). Two or more of these additives may be blended.

The end modified polyamide resin of the present invention and the polyamide resin composition obtained using the end modified polyamide resin can be molded into a desired shape by any melt molding method such as injection molding, extrusion molding, blow molding, vacuum molding, melt spinning or film molding. Molded articles obtained by molding the end modified polyamide resin and the polyamide resin composition obtained using the end modified polyamide resin can be used as, for example, resin molded articles such as electric and electronic device components, automobile components and machine components, fibers for clothing and industrial materials, and films for packaging and magnetic recording.

EXAMPLES

Hereinafter, the present invention will be described further in detail by way of examples, but the present invention is not limited to these examples described below. In examples and comparative examples, characteristics were evaluated in accordance with the following methods.

[Relative Viscosity ($\eta r$)]

The relative viscosity of a 98% sulfuric acid solution of an end modified polyamide resin or polyamide resin obtained in each of examples and comparative examples, which had a resin concentration of 0.01 g/ml, was measured at 25° C. using an Ostwald viscometer.

[Molecular Weight]

2.5 mg of the end modified polyamide resin or polyamide resin obtained in each of examples and comparative examples was dissolved in 4 ml of hexafluoroisopropanol (containing 0.005 N sodium trifluoroacetate), and the resulting solution was filtered by a 0.45 μm filter. Using the resulting solution, the number average molecular weight (Mn) and the weight average molecular weight (Mw) (weight average molecular weight before melt retention) were measured by GPC measurement. Measurement conditions are shown below.

Pump: e-Alliance GPC system (manufactured by Waters Corporation)
Detector: differential refractometer Waters 2414 (manufactured by Waters Corporation)
Column: Shodex HFIP-806M (two pieces)+HFIP-LG
Solvent: hexafluoroisopropanol (containing 0.005 N sodium trifluoroacetate)
Flow rate: 1 ml/min
Sample injection amount: 0.1 ml
Temperature: 30° C.
Molecular weight standard: polymethyl methacrylate.

[Amount of Amino End Group [NH$_2$]]

0.5 g of the end-modified polyamide resin or polyamide resin obtained in each of examples and comparative examples was precisely weighed, 25 ml of a phenol/ethanol mixed solution (ratio: 83.5/16.5 in terms of a mass ratio) was added to dissolve the end modified polyamide resin or polyamide resin at room temperature, and the amount (mol/t) of an amino end group was then determined by titrating the resulting solution with 0.02 N hydrochloric acid using thymol blue as an indicator.

[Amount of Carboxyl End Group [COOH]]

0.5 g of the end-modified polyamide resin or polyamide resin obtained in each of examples and comparative examples was precisely weighed, 20 ml of benzyl alcohol was added to dissolve the end modified polyamide resin or polyamide resin at a temperature of 195° C., and the amount (mol/t) of a carboxyl end group was determined by titrating the resulting solution at 195° C. using a solution of 0.02 N potassium hydroxide in ethanol.

[Identification of End Structure and Quantitative Determination of Content of End Structure of General Formula (I) and Content of End Structure of General Formula (II)]

For the end modified polyamide resin or polyamide resin obtained in each of examples and comparative examples, $^1$H-NMR measurement was performed using FT-NMR JNM-AL400 manufactured by JAPAN ELECTRON OPTICS LABORATORY CO., LTD. First, a solution having a sample concentration of 50 mg/mL was prepared using deuterated sulfuric acid as a measurement solvent. $^1$H-NMR measurement of the polyamide resin was performed with a cumulative number of 256. Peaks derived from $R^1$ and $R^2$ moieties in the end structure represented by the general formula (I), a peak derived from a $R^3$ moiety in the end structure represented by the general formula (II), and a peak derived from a repeating structural unit of a polyamide resin skeleton were identified. The integrated intensity at each peak was calculated, and from the calculated integrated intensity and the number of hydrogen atoms in each structural unit, the content [I] (mol/t, % by mass) (content before retention) of the end structure represented by the general formula (I) and the content [II] (mol/t, % by mass) of the end structure represented by general formula (II) in the end modified polyamide resin were each calculated.

[Thermal Characteristic]

A differential scanning calorimeter (DSC Q20) manufactured by TA Instruments was used. 5 to 7 mg of the end modified polyamide resin or polyamide resin obtained in each of examples and comparative examples was precisely weighed, and the temperature was elevated from 20° C. to 250° C. at a temperature elevation rate of 20° C./min under a nitrogen atmosphere. The top of an endothermic peak appearing in elevation of the temperature was defined as a melting point (Tm).

[Melt Viscosity]

The end modified polyamide resin or polyamide resin obtained in each of examples and comparative examples was dried in a vacuum oven at 80° C. for 12 hours or more. A capillary flow meter (Capirograph Model: 1C manufactured by Toyo Seiki Seisaku-sho, Ltd.) was used as a melt viscosity measuring apparatus. The melt viscosity (melt viscosity before retention) was measured at a melting point+60° C. and a shear rate of 9728 sec$^{-1}$ in an orifice having a diameter of 0.5 mm and a length of 5 mm. However, for melting the end modified polyamide resin or polyamide resin, measurement was performed after retention for 5 minutes. The smaller the value of the melt viscosity, the higher the fluidity.

[Melt Viscosity Retention]

The end modified polyamide resin or polyamide resin obtained in each of examples and comparative examples was dried in a vacuum oven at 80° C. for 12 hours or more. A capillary flow meter (Capirograph Model: 1C manufactured by Toyo Seiki Seisaku-sho, Ltd.) was used. The melt viscosity (melt viscosity after retention) was measured at a shear rate of 9728 sec$^{-1}$ after melt retention at a melting point+60° C. for 60 minutes in an orifice having a diameter of 0.5 mm and a length of 5 mm. The melt viscosity retention [%] was calculated by (melt viscosity after retention/melt viscosity before retention)×100 from the melt viscosity (melt viscosity before retention) and melt viscosity (melt viscosity after retention) measured by the above-described method.

[Weight Average Molecular Weight Retention]

The end modified polyamide resin or polyamide resin obtained in each of examples and comparative examples was dried in a vacuum oven at 80° C. for 12 hours or more. A capillary flow meter (Capirograph Model: 1C manufactured by Toyo Seiki Seisaku-sho, Ltd.) was used. The end modified polyamide resin or polyamide resin was retained at a melting point+60° C. for 60 minutes in an orifice having a diameter of 0.5 mm and a length of 5 mm. The weight average molecular weight (Mw) (weight average molecular weight after retention) of the end modified polyamide resin or polyamide resin after melt retention was measured by the same GPC measurement as the above-mentioned molecular weight measurement method. The weight average molecular weight retention [%] was calculated by (weight average molecular weight after retention/weight average molecular weight before retention)×100 from the weight average molecular weight (weight average molecular weight before melt retention) and weight average molecular weight (weight average molecular weight after retention) measured by the above-described method.

[Content Retention]

The end modified polyamide resin or polyamide resin obtained in each of examples and comparative examples was dried in a vacuum oven at 80° C. for 12 hours or more. A capillary flow meter (Capirograph Model: 1C manufactured by Toyo Seiki Seisaku-sho, Ltd.) was used. The end modified polyamide resin or polyamide resin was retained at a melting point+60° C. for 60 minutes in an orifice having a diameter of 0.5 mm and a length of 5 mm. For the end modified polyamide resin or polyamide resin after melt retention, the content [I] (mol/t) (content after retention) of the end structure represented by the general formula (I) in the end modified polyamide resin was calculated by the same $^1$H-NMR measurement as the above-described end structure content measurement method. The content retention was calculated by (content after retention/content before retention)×100 from the content [I] (mol/t) (content before retention) of the end structure represented by the general formula (I) and the content [I] (mol/t) (content after retention) of the end structure represented by the general formula (I), which were measured by the above-described method.

[Mass Reduction Ratio]

The end modified polyamide resin or polyamide resin obtained in each of examples and comparative examples was dried in a vacuum oven at 80° C. for 12 hours or more. 20 mg of an arbitrary portion was cut out, and kept at a temperature higher by 60° C. than the melting point of the end modified polyamide resin or polyamide resin for 40 minutes under a nitrogen gas atmosphere, and the mass reduction ratio [%] before and after heat treatment was measured using a thermogravimetric analysis apparatus (TGA 7 manufactured by PerkinElmer, Inc.).

[Molding Processability]

The end modified polyamide resin or polyamide resin obtained in each of examples and comparative examples was dried in a vacuum oven at 80° C. for 12 hours or more. An injection molding machine IS55 EPN manufactured by TOSHIBA MACHINE CO., LTD was used. The cylinder temperature was set to three patterns: temperatures higher by 5° C., 10° C. and 15° C. than the melting point (Tm) of the end modified polyamide resin or polyamide resin, the mold temperature was set to 80° C., and an ASTM Type 4 dumbbell having a test piece thickness of ⅟25 inches (about 1.0 mm) was injection-molded under a molding cycle condition in which the total of the injection time and the pressure keeping time was 10 seconds, and the cooling time was 10 seconds. Injection molding was performed five times. A sample was rated ○ when it was able to collect a molded piece in all of the five molding injections, and a sample was rated x when it was not able to sufficiently fill the mold or collect a molded article in all of the five molding injections.

[Tensile Elongation at Break]

The end modified polyamide resin or polyamide resin obtained in each of examples and comparative examples was dried in a vacuum oven at 80° C. for 12 hours or more. An injection molding machine IS55 EPN manufactured by TOSHIBA MACHINE CO., LTD was used. The cylinder temperature was set to a temperatures higher by 60° C. than the melting point (Tm) of the end modified polyamide resin or polyamide resin, the mold temperature was set to 80° C., and an ASTM Type 4 dumbbell evaluating test piece having a test piece thickness of ⅟25 inches (about 1.0 mm) was injection-molded under a molding cycle condition in which the total of the injection time and the pressure keeping time was 10 seconds, and the cooling time was 10 seconds. The resulting ASTM Type 4 dumbbell-shaped test piece was set in "Tensilon" (registered trademark) UTA-2.5T (manufactured by ORIENTEC Co., LTD.), and the tensile elongation at break was measured by conducting a tension test at a strain rate of 10 mm/min under an atmosphere at a temperature of 23° C. and a humidity of 50% in accordance with ASTM-D 638.

[Raw Materials]

In examples and comparative examples, the following raw materials were used.

ε-Caprolactam: Wako special grade chemical manufactured by Wako Pure Chemical Industries, Ltd.

Hexamethylenediamine: Wako first class chemical manufactured by Wako Pure Chemical Industries, Ltd.

Adipic acid: Wako special grade chemical manufactured by Wako Pure Chemical Industries, Ltd.

Sebacic acid: Wako first class chemical manufactured by Wako Pure Chemical Industries, Ltd.

[Terminal Modification Agent Represented by General Formula (III)]

Methoxy poly(ethylene glycol)poly(propylene glycol) amine represented by the following structural formula (Chemical Formula 1): "JEFFAMINE" (registered trademark) M1000 (number average molecular weight Mn 1000) manufactured by HUNTSMAN Corporation.

[Chemical Formula 1]

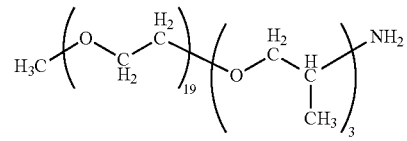

Methoxy poly(ethylene glycol)poly(propylene glycol) amine represented by the following structural formula (Chemical Formula 2): "JEFFAMINE" (registered trademark) M2070 (number average molecular weight Mn 2000) manufactured by HUNTSMAN Corporation.

[Chemical Formula 2]

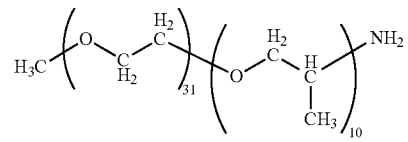

Methoxy ethylene glycol poly(propylene glycol)amine represented by the following structural formula (chemical formula 3): "JEFFAMINE" (registered trademark) M600 (number average molecular weight Mn 600) manufactured by HUNTSMAN Corporation.

[Chemical Formula 3]

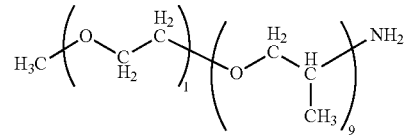

[Terminal Modification Agent Represented by General Formula (IV)]

Benzoic acid: special grade chemical manufactured by Wako Pure Chemical Industries, Ltd.

Acetic acid: special grade chemical manufactured by Wako Pure Chemical Industries, Ltd.

Stearic acid: special grade chemical manufactured by Wako Pure Chemical Industries, Ltd.

Cerotic acid: manufactured by Tokyo Chemical Industry Co., Ltd.

Example 1

20 g of ε-caprolactam, 20 g of ion-exchanged water, 1.6 g of "JEFFAMINE" M1000 and 0.14 g of benzoic acid were added in a reaction vessel, sealed, and purged with nitrogen. The set temperature of a heater on the outer periphery of the reaction vessel was set to 290° C., and heating was started. After the internal pressure reached 1.0 MPa, the internal pressure was kept at 1.0 MPa while moisture was released to the outside of the system, and the temperature was elevated until the internal temperature reached 240° C. After the internal temperature reached 240° C., the set temperature of the heater was changed to 270° C., and the internal pressure was adjusted to turn to normal pressure over 1 hour (internal temperature at the time of reaching normal pressure: 243° C.). Subsequently, the reaction vessel was held while nitrogen was fed into the vessel (nitrogen flow) for 240 minutes, thereby obtaining an end modified polyamide 6 resin (maximum ultimate temperature: 253° C.). Subsequently, the resulting end modified polyamide 6 resin was subjected to Soxhlet extraction with ion-exchanged water to remove an unreacted terminal modification agent. The end modified polyamide 6 resin thus obtained had a relative viscosity of 1.81, a weight average molecular weight of 30000, a melting point (Tm) of 220° C. and a melt viscosity of 5.5 Pa·s. In addition, the resulting end modified polyamide 6 resin included an end modified polyamide 6 resin having, at the ends thereof, a structure represented by the following chemical formula 4 and a structure represented by the following chemical formula 5. Other physical properties are shown in Table 1-1 and Table 1-2.

[Chemical Formula 4]

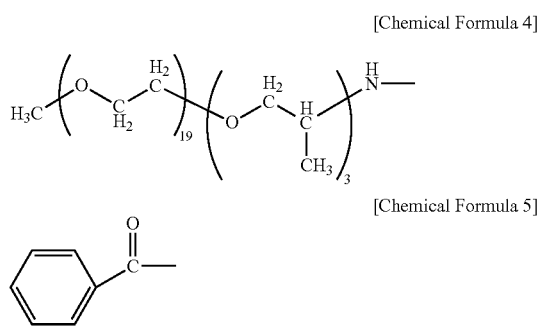

[Chemical Formula 5]

Examples 2 to 26 and 32 to 35 and Comparative Examples 1 to 6

Except that the raw material was changed to the composition shown in the table, and the time (nitrogen flow time) during which the reaction vessel was held while nitrogen was fed into the vessel after the internal pressure was set to normal pressure was changed to the time shown in the table, the same procedure as in Example 1 was carried out to obtain a polyamide 6 resin. Here, the polyamide resin obtained in each of Examples 2 to 9 and 14 to 26 and Comparative Examples 1 to 4 included an end modified polyamide 6 resin having, at the ends thereof, a structure represented by the following chemical formula 4 and a structure represented by the following chemical formula 5.

[Chemical Formula 4]

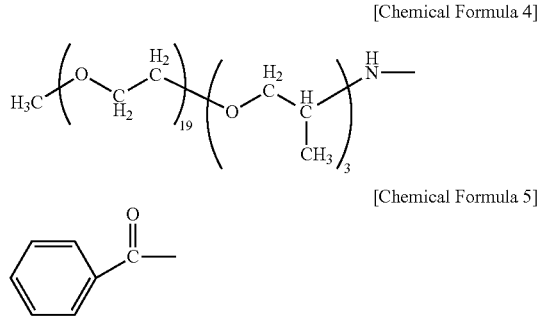

[Chemical Formula 5]

In addition, the polyamide resin obtained in each of Examples 10 to 12 included an end modified polyamide 6 resin having, at the ends thereof, a structure represented by the following chemical formula 6 and a structure represented by the following chemical formula 5.

[Chemical Formula 6]

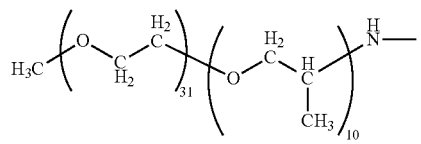

[Chemical Formula 5]

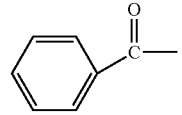

In addition, the polyamide resin obtained in Example 13 included an end modified polyamide 6 resin having, at the ends thereof, a structure represented by the following chemical formula 7 and a structure represented by the following chemical formula 5.

[Chemical Formula 7]

[Chemical Formula 5]

In addition, the polyamide resin obtained in Comparative Example 6 included an end modified polyamide 6 resin having, at the end thereof, a structure represented by the following chemical formula 4.

[Chemical Formula 4]

In addition, the polyamide resin obtained in Comparative Example 5 included an end modified polyamide 6 resin having, at the end thereof, a structure represented by the following chemical formula 5.

[Chemical Formula 5]

Thereafter, each characteristic was evaluated in the same manner as in Example 1. The results are shown in the table.

Example 27

Except that the raw material was changed to the composition shown in the table, and the time (nitrogen flow time) during which the reaction vessel was held while nitrogen was fed into the vessel after the internal pressure was set to normal pressure was changed to the time shown in the table, the same procedure as in Example 1 was carried out to obtain a polyamide 6 resin. Here, the end modified polyamide resin obtained in Example 27 included an end modified polyamide 6 resin having, at the ends thereof, a structure represented by the following chemical formula 4 and a structure represented by the following chemical formula 8.

[Chemical Formula 4]

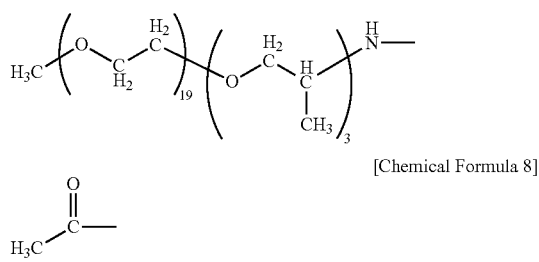

[Chemical Formula 8]

Thereafter, each characteristic was evaluated in the same manner as in Example 1. The results are shown in the table.

Examples 28 and 29

Except that the raw material was changed to the composition shown in the table, and the time (nitrogen flow time) during which the reaction vessel was held while nitrogen was fed into the vessel after the internal pressure was set to normal pressure was changed to the time shown in the table, the same procedure as in Example 1 was carried out to obtain a polyamide 6 resin. Here, the end modified polyamide resin obtained in each of Examples 28 and 29 included an end modified polyamide 6 resin having, at the ends thereof, a structure represented by the following chemical formula 4 and a structure represented by the following chemical formula 9.

[Chemical Formula 4]

[Chemical Formula 9]

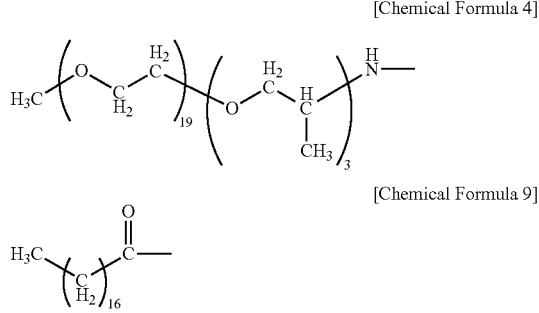

Thereafter, each characteristic was evaluated in the same manner as in Example 1. The results are shown in the table.

Example 30 and Comparative Example 7

Except that the raw material was changed to the composition shown in the table, and the time (nitrogen flow time) during which the reaction vessel was held while nitrogen was fed into the vessel after the internal pressure was set to normal pressure was changed to the time shown in the table, the same procedure as in Example 1 was carried out to obtain a polyamide 6 resin. Here, the resulting end modified polyamide resin included an end modified polyamide 6 resin having, at the ends thereof, a structure represented by the following chemical formula 4 and a structure represented by the following chemical formula 10.

[Chemical Formula 4]

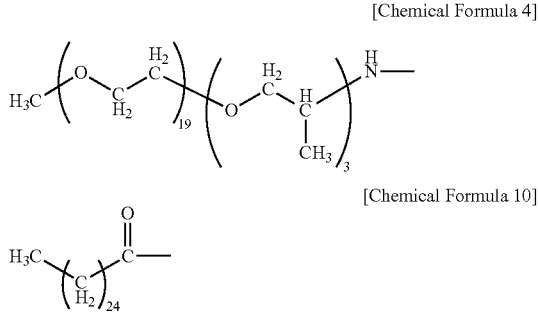

[Chemical Formula 10]

Thereafter, each characteristic was evaluated in the same manner as in Example 1. The results are shown in the table.

Example 31 and Comparative Examples 8 and 9

Except that the raw material was changed to the composition shown in the table, and the time (nitrogen flow time) during which the reaction vessel was held while nitrogen was fed into the vessel after the internal pressure was set to normal pressure was changed to the time shown in the table, the same procedure as in Example 1 was carried out to obtain a polyamide 6 resin. Here, the resulting end modified polyamide resin included an end modified polyamide 6 resin having, at the ends thereof, a structure represented by the following chemical formula 6 and a structure represented by the following chemical formula 10.

[Chemical Formula 6]

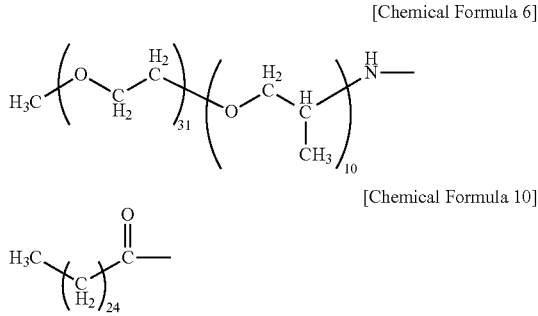

[Chemical Formula 10]

Thereafter, each characteristic was evaluated in the same manner as in Example 1. The results are shown in the table.

Example 36

9.46 g of hexamethylenediamine, 11.92 g of adipic acid, 20 g of ion-exchanged water, 1.6 g of "JEFFAMINE" M1000 and 0.14 g of benzoic acid were added in a reaction vessel, sealed, and purged with nitrogen. The set temperature of a heater on the outer periphery of the reaction vessel was set to 290° C., and heating was started. After the internal pressure reached 1.75 MPa, the internal pressure was kept at 1.75 MPa while moisture was released to the outside of the system, and the temperature was elevated until the internal temperature reached 260° C. After the internal temperature reached 260° C., the set temperature of the heater was changed to 290° C., and the internal pressure was adjusted to turn to normal pressure over 1 hour (internal temperature at the time of reaching normal pressure: 270° C.). Subsequently, the reaction vessel was held while nitrogen was fed into the vessel (nitrogen flow) for 240 minutes, thereby obtaining an end modified polyamide 66 resin (maximum ultimate temperature: 275° C.). Here, the resulting polyamide resin included an end modified polyamide 66 resin having, at the ends thereof, a structure represented by the following chemical formula 4 and a structure represented by the following chemical formula 5.

[Chemical Formula 4]

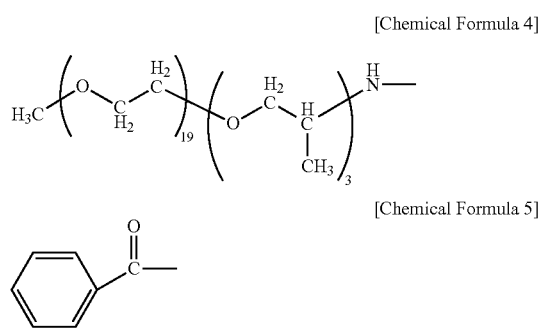

[Chemical Formula 5]

Thereafter, each characteristic was evaluated in the same manner as in Example 1. The results are shown in the table.

Example 37

7.74 g of hexamethylenediamine, 13.46 g of sebacic acid, 20 g of ion-exchanged water, 1.6 g of "JEFFAMINE" M1000 and 0.14 g of benzoic acid were added in a reaction vessel, sealed, and purged with nitrogen. The set temperature of a heater on the outer periphery of the reaction vessel was set to 290° C., and heating was started. After the internal pressure reached 1.0 MPa, the internal pressure was kept at 1.0 MPa while moisture was released to the outside of the system, and the temperature was elevated until the internal temperature reached 240° C. After the internal temperature reached 240° C., the set temperature of the heater was changed to 290° C., and the internal pressure was adjusted to turn to normal pressure over 1 hour (internal temperature at the time of reaching normal pressure: 243° C.). Subsequently, the reaction vessel was held while nitrogen was fed into the vessel (nitrogen flow) for 240 minutes, thereby obtaining an end modified polyamide 610 resin (maximum ultimate temperature: 253° C.). Here, the resulting polyamide resin included an end modified polyamide 610 resin having, at the ends thereof, a structure represented by the following chemical formula 4 and a structure represented by the following chemical formula 5.

[Chemical Formula 4]

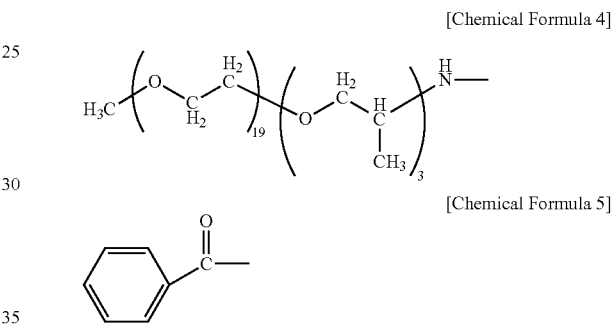

[Chemical Formula 5]

Thereafter, each characteristic was evaluated in the same manner as in Example 1. The results are shown in the table.

TABLE 1-1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Raw materials | ε-Caprolactam | | g | 20 | 20 | 20 | 20 | 20 | 20 | 20 | 20 | 20 |
| | "JEFFAMINE" M1000 | | g | 1.6 | 2.1 | 0.5 | 1.0 | 1.3 | 1.3 | 1.3 | 1.3 | 2.7 |
| | "JEFFAMINE" M2070 | | g | — | — | — | — | — | — | — | — | — |
| | "JEFEAMINE" M600 | | g | — | — | — | — | — | — | — | — | — |
| | Benzoic acid | | g | 0.14 | 0.14 | 0.14 | 0.14 | 0.14 | 0.14 | 0.14 | 0.07 | 0.35 |
| | Ion-exchanged water | | g | 20 | 20 | 20 | 20 | 20 | 20 | 20 | 20 | 20 |
| | Nitrogen flow time | | min | 240 | 240 | 150 | 180 | 210 | 360 | 300 | 180 | 240 |
| Polymer characteristics | End terminal content | [I] | % by mass | 6.7 | 8.8 | 2.3 | 4.1 | 5.3 | 5.3 | 5.3 | 5.3 | 11.5 |
| | | [II] | % by mass | 0.48 | 0.46 | 0.49 | 0.48 | 0.48 | 0.48 | 0.48 | 0.24 | 1.19 |
| | | [I] | mol/t | 67 | 88 | 24 | 41 | 53 | 53 | 53 | 53 | 115 |
| | | [II] | mol/t | 46 | 44 | 47 | 46 | 46 | 46 | 46 | 23 | 113 |
| | Total number of moles [I] + [II] | | mol/t | 113 | 132 | 71 | 87 | 99 | 99 | 99 | 76 | 228 |
| | Molar ratio [I]/[II] | | — | 1.47 | 2.02 | 0.51 | 0.90 | 1.16 | 1.16 | 1.16 | 2.32 | 1.02 |
| | [NH$_2$] | | mol/t | 73 | 91 | 60 | 66 | 70 | 31 | 40 | 90 | 72 |
| | [COOH] | | mol/t | 44 | 54 | 88 | 69 | 59 | 22 | 29 | 59 | 70 |
| | Total number of moles [NH$_2$] + [COOH] | | mol/t | 117 | 145 | 148 | 135 | 129 | 53 | 69 | 149 | 142 |
| | Molar ratio [NH$_2$]/[COOH] | | — | 1.66 | 1.69 | 0.68 | 0.96 | 1.19 | 1.41 | 1.38 | 1.53 | 1.03 |

TABLE 1-2

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Polymer characteristics | Melting point (Tm) | °C. | 220 | 220 | 220 | 220 | 220 | 220 | 220 | 220 | 219 |
|  | ηr | — | 1.81 | 1.63 | 2.09 | 1.98 | 1.87 | 2.58 | 2.05 | 1.85 | 1.23 |
|  | Weight average molecular weight (Mw) | ten thousand | 3.0 | 2.4 | 3.0 | 3.0 | 3.0 | 5.6 | 4.3 | 3.0 | 1.7 |
|  | Number average molecular weight (Mn) | ten thousand | 1.5 | 1.4 | 1.5 | 1.5 | 1.5 | 2.5 | 2.1 | 1.5 | 0.8 |
|  | Melt viscosity | Pa·s | 5.5 | 2.9 | 14.8 | 11.7 | 8.9 | 19.7 | 13.7 | 8.7 | 1.9 |
| Thermal stability at melt retention | Content retention | % | 92 | 90 | 93 | 93 | 93 | 96 | 94 | 89 | 91 |
|  | Melt viscosity retention | % | 104 | 109 | 107 | 108 | 106 | 106 | 106 | 109 | 108 |
|  | Weight average molecular weight retention | % | 107 | 109 | 107 | 105 | 109 | 109 | 109 | 109 | 106 |
|  | Mass reduction ratio | % | 2.4 | 2.7 | 2.7 | 2.4 | 2.5 | 2.5 | 2.4 | 2.8 | 2.8 |
| Molding processability | Melting point (Tm) +5° C. | — | ○ | ○ | X | X | ○ | X | X | ○ | ○ |
|  | Melting point (Tm) +10° C. | — | ○ | ○ | ○ | ○ | ○ | X | ○ | ○ | ○ |
|  | Melting point (Tm) +15° C. | — | ○ | ○ | ○ | ○ | ○ | ○ | ○ | ○ | ○ |
| Mechanical physical properties | Tensile elongation at break | % | >200 | >200 | >200 | >200 | >200 | >200 | >200 | >200 | 105 |

TABLE 2-1

|  |  |  |  | Example 10 | Example 11 | Example 12 | Example 13 | Example 14 | Example 15 |
|---|---|---|---|---|---|---|---|---|---|
| Raw materials | ε-Caprolactam |  | g | 20 | 20 | 20 | 20 | 20 | 20 |
|  | "JEFFAMINE" M1000 |  | g | — | — | — | — | 3.1 | 3.1 |
|  | "JEFFAMINE" M2070 |  | g | 1.6 | 2.4 | 3.5 | — | — | — |
|  | "JEFFAMINE" M600 |  | g | — | — | — | 1.6 | — | — |
|  | Benzoic acid |  | g | 0.14 | 0.14 | 0.14 | 0.21 | 0.41 | 0.41 |
|  | Ion-exchanged water |  | g | 20 | 20 | 20 | 20 | 20 | 20 |
|  | Nitrogen flow time |  | min | 240 | 270 | 300 | 240 | 180 | 360 |
| Polymer characteristics | End terminal content | [I] | % by mass | 6.7 | 10.6 | 15.2 | 6.7 | 13 | 13 |
|  |  | [II] | % by mass | 0.49 | 0.49 | 0.49 | 0.73 | 1.42 | 1.42 |
|  |  | [I] | mol/t | 37 | 53 | 76 | 91 | 130 | 130 |
|  |  | [II] | mol/t | 47 | 47 | 47 | 70 | 135 | 135 |
|  | Total number of moles [I] + [II] |  | mol/t | 84 | 100 | 123 | 161 | 265 | 265 |
|  | Molar ratio [I]/[II] |  | — | 0.79 | 1.13 | 1.63 | 1.31 | 0.96 | 0.96 |
|  | [NH$_2$] |  | mol/t | 74 | 67 | 67 | 39 | 65 | 10 |
|  | [COOH] |  | mol/t | 75 | 59 | 35 | 19 | 65 | 10 |
|  | Total number of moles [NH$_2$] + [COOH] |  | mol/t | 149 | 126 | 102 | 58 | 130 | 20 |
|  | Molar ratio [NH$_2$]/[COOH] |  | — | 0.99 | 1.14 | 1.91 | 2.05 | 1.00 | 1.00 |

|  |  |  |  | Example 16 | Example 17 | Example 18 | Example 19 | Example 20 | Example 21 |
|---|---|---|---|---|---|---|---|---|---|
| Raw materials | ε-Caprolactam |  | g | 20 | 20 | 20 | 20 | 20 | 20 |
|  | "JEFFAMINE" M1000 |  | g | 0.3 | 2.1 | 1.9 | 1.9 | 0.5 | 0.5 |
|  | "JEFFAMINE" M2070 |  | g | — | — | — | — | — | — |
|  | "JEFFAMINE" M600 |  | g | — | — | — | — | — | — |
|  | Benzoic acid |  | g | 0.04 | 0.08 | 0.08 | 0.08 | 0.29 | 0.29 |
|  | Ion-exchanged water |  | g | 20 | 20 | 20 | 20 | 20 | 20 |
|  | Nitrogen flow time |  | min | 60 | 180 | 210 | 150 | 360 | 300 |
| Polymer characteristics | End terminal content | [I] | % by mass | 1.1 | 8.6 | 8.1 | 8.6 | 2.0 | 2.0 |
|  |  | [II] | % by mass | 0.12 | 0.26 | 0.26 | 0.26 | 0.98 | 0.99 |
|  |  | [I] | mol/t | 11 | 86 | 81 | 81 | 20 | 20 |
|  |  | [II] | mol/t | 11 | 25 | 25 | 25 | 94 | 95 |
|  | Total number of moles [I] + [II] |  | mol/t | 22 | 111 | 106 | 106 | 114 | 115 |

TABLE 2-1-continued

|  |  |  |  |  |  |  |  |
|---|---|---|---|---|---|---|---|
| Molar ratio [I]/[II] | — | 0.96 | 3.45 | 3.25 | 3.25 | 0.21 | 0.21 |
| [NH$_2$] | mol/t | 98 | 97 | 86 | 104 | 24 | 58 |
| [COOH] | mol/t | 99 | 50 | 29 | 55 | 92 | 118 |
| Total number of moles [NH$_2$] + [COOH] | mol/t | 197 | 147 | 115 | 159 | 116 | 176 |
| Molar ratio [NH$_2$]/[COOH] | — | 0.99 | 1.94 | 2.97 | 1.89 | 0.26 | 0.49 |

TABLE 2-2

|  |  |  | Example 10 | Example 11 | Example 12 | Example 13 | Example 14 | Example 15 |
|---|---|---|---|---|---|---|---|---|
| Polymer characteristics | Melting point (Tm) | ° C. | 220 | 218 | 217 | 220 | 219 | 219 |
|  | ηr | — | 1.96 | 1.43 | 1.29 | 1.92 | 1.18 | 1.34 |
|  | Weight average molecular weight (Mw) | ten thousand | 3.0 | 3.0 | 3.0 | 3.0 | 1.7 | 2.4 |
|  | Number average molecular weight (Mn) | ten thousand | 1.5 | 1.5 | 1.5 | 1.5 | 0.9 | 1.2 |
|  | Melt viscosity | Pa · s | 9.7 | 6.1 | 3.1 | 10.2 | 1.6 | 2.2 |
| Thermal stability at melt retention | Content retention | % | 94 | 89 | 86 | 91 | 81 | 83 |
|  | Melt viscosity retention | % | 105 | 105 | 105 | 105 | 132 | 121 |
|  | Weight average molecular weight retention | % | 109 | 109 | 109 | 109 | 106 | 81 |
|  | Mass reduction ratio | % | 2.8 | 3.0 | 3.3 | 2.8 | 3.9 | 3.6 |
| Molding processability | Melting point (Tm) +5° C. | — | ○ | ○ | ○ | X | ○ | ○ |
|  | Melting point (Tm) +10° C. | — | ○ | ○ | ○ | ○ | ○ | ○ |
|  | Melting point (Tm) +15° C. | — | ○ | ○ | ○ | ○ | ○ | ○ |
| Mechanical physical properties | Tensile elongation at break | % | >200 | >200 | 175 | >200 | 75 | 120 |

|  |  |  | Example 16 | Example 17 | Example 18 | Example 19 | Example 20 | Example 21 |
|---|---|---|---|---|---|---|---|---|
| Polymer characteristics | Melting point (Tm) | ° C. | 218 | 221 | 221 | 221 | 219 | 219 |
|  | ηr | — | 2.04 | 1.54 | 1.71 | 1.48 | 1.99 | 1.79 |
|  | Weight average molecular weight (Mw) | ten thousand | 3.0 | 2.4 | 3.0 | 2.4 | 3.0 | 2.4 |
|  | Number average molecular weight (Mn) | ten thousand | 1.5 | 1.2 | 1.5 | 1.2 | 1.5 | 1.2 |
|  | Melt viscosity | Pa · s | 19.6 | 2.9 | 4.6 | 3.6 | 16.7 | 12.7 |
| Thermal stability at melt retention | Content retention | % | 82 | 84 | 81 | 81 | 84 | 81 |
|  | Melt viscosity retention | % | 119 | 117 | 117 | 117 | 113 | 118 |
|  | Weight average molecular weight retention | % | 117 | 108 | 84 | 119 | 84 | 116 |
|  | Mass reduction ratio | % | 3.7 | 3.6 | 3.7 | 3.8 | 3.5 | 3.8 |
| Molding processability | Melting point (Tm) +5° C. | — | X | ○ | ○ | ○ | X | X |
|  | Melting point (Tm) +10° C. | — | X | ○ | ○ | ○ | X | ○ |
|  | Melting point (Tm) +15° C. | — | ○ | ○ | ○ | ○ | ○ | ○ |
| Mechanical physical properties | Tensile elongation at break | % | 140 | 105 | 150 | 120 | 175 | 105 |

TABLE 3-1

|  |  |  | Example 22 | Example 23 | Example 24 | Example 25 | Example 26 | Example 27 | Example 28 | Example 29 | Example 30 | Example 31 |
|---|---|---|---|---|---|---|---|---|---|---|---|---|
| Raw materials | ε-Caprolactam | g | 20 | 20 | 20 | 20 | 20 | 20 | 20 | 20 | 20 | 20 |
|  | "JEFFAMINE" M1000 | g | 1.3 | 1.6 | 1.0 | 1.0 | 2.2 | 1.6 | 1.6 | 1.6 | 1.6 | — |
|  | "JEFFAMINE" M2070 | g | — | — | — | — | — | — | — | — | — | 3.5 |
|  | "JEFFAMINE" M600 | g | — | — | — | — | — | — | — | — | — | — |
|  | Benzoic acid | g | 0.18 | 0.14 | 0.25 | 0.25 | 0.14 | — | — | — | — | — |
|  | Acetic acid | g | — | — | — | — | — | 0.07 | — | — | — | — |

TABLE 3-1-continued

|  |  |  | Example 22 | Example 23 | Example 24 | Example 25 | Example 26 | Example 27 | Example 28 | Example 29 | Example 30 | Example 31 |
|---|---|---|---|---|---|---|---|---|---|---|---|---|
|  | Stearic acid | g | — | — | — | — | — | — | 0.32 | 0.81 | — | — |
|  | Cerotic acid | g | — | — | — | — | — | — | — | — | 1.14 | 1.14 |
|  | Ion-exchanged water | g | 20 | 20 | 20 | 20 | 20 | 20 | 20 | 20 | 20 | 20 |
|  | Nitrogen flow time | min | 360 | 180 | 240 | 120 | 300 | 200 | 260 | 300 | 300 | 300 |
| Polymer charac-teristics | End terminal content | [I] % by mass | 5.3 | 6.7 | 4.1 | 4.1 | 9.1 | 6.7 | 6.7 | 6.7 | 6.7 | 15.2 |
|  |  | [II] % by mass | 0.60 | 0.44 | 0.87 | 0.87 | 0.44 | 0.24 | 0.55 | 2.74 | 3.87 | 3.87 |
|  |  | [I] mol/t | 53 | 67 | 41 | 41 | 91 | 67 | 67 | 67 | 67 | 76 |
|  |  | [II] mol/t | 57 | 42 | 80 | 80 | 42 | 46 | 46 | 113 | 113 | 112 |
|  | Total number of moles [I] + [II] | mol/t | 110 | 109 | 121 | 121 | 133 | 113 | 113 | 180 | 180 | 188 |
|  | Molar ratio [I]/[II] | — | 0.93 | 1.61 | 0.51 | 0.51 | 2.19 | 1.47 | 1.46 | 0.59 | 0.59 | 0.68 |
|  |  | [NH$_2$] mol/t | 22 | 100 | 25 | 70 | 71 | 74 | 73 | 35 | 35 | 32 |
|  |  | [COOH] mol/t | 24 | 70 | 70 | 100 | 21 | 44 | 44 | 69 | 70 | 61 |
|  | Total number of moles [NH$_2$] + [COOH] | mol/t | 46 | 170 | 95 | 170 | 92 | 118 | 117 | 104 | 105 | 93 |
|  | Molar ratio [NH$_2$]/[COOH] | — | 0.92 | 1.43 | 0.36 | 0.70 | 3.38 | 1.68 | 1.66 | 0.51 | 0.50 | 0.52 |

TABLE 3-2

|  |  |  | Example 22 | Example 23 | Example 24 | Example 25 | Example 26 |
|---|---|---|---|---|---|---|---|
| Polymer characteristics | Melting point (Tm) | ° C. | 220 | 220 | 220 | 221 | 220 |
|  | ηr | — | 2.04 | 1.68 | 1.92 | 1.76 | 1.61 |
|  | Weight average molecular weight (Mw) | ten thousand | 4.3 | 2.4 | 3.0 | 2.4 | 3.0 |
|  | Number average molecular weight (Mn) | ten thousand | 2.2 | 1.2 | 1.5 | 1.2 | 1.5 |
|  | Melt viscosity | Pa · s | 14.8 | 4.5 | 9.0 | 7.1 | 4.0 |
| Thermal stability at melt retention | Content retention | % | 93 | 87 | 88 | 87 | 87 |
|  | Melt viscosity retention | % | 88 | 114 | 112 | 114 | 113 |
|  | Weight average molecular weight retention | % | 86 | 113 | 89 | 114 | 88 |
|  | Mass reduction ratio | % | 2.1 | 3.3 | 3.3 | 3.4 | 3.2 |
| Molding processability | Melting point (Tm) +5° C. | — | X | ○ | ○ | ○ | ○ |
|  | Melting point (Tm) +10° C. | — | X | ○ | ○ | ○ | ○ |
|  | Melting point (Tm) +15° C. | — | ○ | ○ | ○ | ○ | ○ |
| Mechanical physical properties | Tensile elongation at break | % | >200 | 175 | 190 | 150 | 190 |

|  |  |  | Example 27 | Example 28 | Example 29 | Example 30 | Example 31 |
|---|---|---|---|---|---|---|---|
| Polymer characteristics | Melting point (Tm) | ° C. | 220 | 220 | 220 | 220 | 220 |
|  | ηr | — | 1.82 | 1.81 | 1.64 | 1.63 | 1.64 |
|  | Weight average molecular weight (Mw) | ten thousand | 3.0 | 3.0 | 2.4 | 2.4 | 2.4 |
|  | Number average molecular weight (Mn) | ten thousand | 1.5 | 1.5 | 1.2 | 1.2 | 1.2 |
|  | Melt viscosity | Pa · s | 5.1 | 5.7 | 2.9 | 3.1 | 3.1 |
| Thermal stability at melt retention | Content retention | % | 93 | 92 | 90 | 90 | 90 |
|  | Melt viscosity retention | % | 103 | 105 | 109 | 109 | 109 |
|  | Weight average molecular weight retention | % | 106 | 108 | 109 | 109 | 109 |
|  | Mass reduction ratio | % | 2.3 | 2.5 | 2.7 | 2.7 | 2.7 |
| Molding processability | Melting point (Tm) +5° C. | — | ○ | ○ | ○ | ○ | ○ |
|  | Melting point (Tm) +10° C. | — | ○ | ○ | ○ | ○ | ○ |
|  | Melting point (Tm) +15° C. | — | ○ | ○ | ○ | ○ | ○ |
| Mechanical physical properties | Tensile elongation at break | % | >200 | >200 | >200 | >200 | 160 |

TABLE 4-1

|  |  |  | Example 32 | Example 33 | Example 34 | Example 35 |
|---|---|---|---|---|---|---|
| Raw materials | ε-Caprolactam | g | 20 | 20 | 20 | 20 |
|  | "JEFFAMINE" M1000 | g | 0.6 | 0.4 | 3.1 | 3.1 |
|  | "JEFFAMINE" M2070 | g | — | — | — | — |
|  | "JEFFAMINE" M600 | g | — | — | — | — |
|  | Benzoic acid | g | 0.08 | 0.06 | 0.15 | 0.14 |
|  | Acetic acid | g | — | — | — | — |
|  | Stearic acid | g | — | — | — | — |
|  | Cerotic acid | g | — | — | — | — |
|  | Ion-exchanged water | g | 20 | 20 | 20 | 20 |
|  | Nitrogen flow time | min | 180 | 180 | 360 | 360 |
| Polymer characteristics | End terminal content [I] | % by mass | 2.5 | 1.7 | 13 | 13 |
|  | [II] | % by mass | 0.26 | 0.19 | 1.42 | 1.42 |
|  | [I] | mol/t | 25 | 17 | 130 | 130 |
|  | [II] | mol/t | 25 | 18 | 48 | 44 |
|  | Total number of moles [I] + [II] | mol/t | 50 | 35 | 178 | 174 |
|  | Molar ratio [I]/[II] | — | 1.00 | 0.94 | 2.71 | 2.95 |
|  | [NH$_2$] | mol/t | 88 | 96 | 13 | 13 |
|  | [COOH] | mol/t | 87 | 93 | 96 | 100 |
|  | Total number of moles [NH$_2$] + [COOH] | mol/t | 175 | 189 | 109 | 113 |
|  | Molar ratio [NH$_2$]/[COOH] | — | 1.01 | 1.03 | 0.14 | 0.13 |

TABLE 4-2

|  |  |  | Example 32 | Example 33 | Example 34 | Example 35 |
|---|---|---|---|---|---|---|
| Polymer characteristics | Melting point (Tm) | ° C. | 220 | 220 | 219 | 219 |
|  | ηr | — | 1.89 | 2.01 | 1.36 | 1.37 |
|  | Weight average molecular weight (Mw) | ten thousand | 3.0 | 3.0 | 2.4 | 2.4 |
|  | Number average molecular weight (Mn) | ten thousand | 1.5 | 1.5 | 1.2 | 1.2 |
|  | Melt viscosity | Pa · s | 13.8 | 18.6 | 2.3 | 2.3 |
| Thermal stability at melt retention | Content retention | % | 86 | 84 | 84 | 82 |
|  | Melt viscosity retention | % | 118 | 119 | 121 | 123 |
|  | Weight average molecular weight retention | % | 124 | 127 | 78 | 76 |
|  | Mass reduction ratio | % | 3.7 | 3.8 | 4.5 | 4.6 |
| Molding processability | Melting point (Tm) +5° C. | — | X | X | ○ | ○ |
|  | Melting point (Tm) +10° C. | — | ○ | X | ○ | ○ |
|  | Melting point (Tm) +15° C. | — | ○ | ○ | ○ | ○ |
| Mechanical physical properties | Tensile elongation at break | % | 175 | 170 | 120 | 120 |

TABLE 5-1

|  |  |  | Comparative Example 1 | Comparative Example 2 | Comparative Example 3 | Comparative Example 4 | Comparative Example 5 |
|---|---|---|---|---|---|---|---|
| Raw materials | ε-Caprolactam | g | 20 | 20 | 20 | 20 | 20 |
|  | "JEFFAMINE" M1000 | g | 6.0 | 0.1 | 1.6 | 1.6 | 0.0 |
|  | "JEFFAMINE" M2070 | g | — | — | — | — | — |
|  | "JEFFAMINE" M600 | g | — | — | — | — | — |
|  | Benzoic acid | g | 0.14 | 0.14 | 0.01 | 1.62 | 0.19 |
|  | Acetic acid | g | — | — | — | — | — |
|  | Stearic acid | g | — | — | — | — | — |
|  | Cerotic acid | g | — | — | — | — | — |
|  | Ion-exchanged water | g | 20 | 20 | 20 | 20 | 20 |

TABLE 5-1-continued

|  |  |  |  |  |  |  |  |  |
|---|---|---|---|---|---|---|---|---|
|  | Nitrogen flow time |  | min | 240 | 60 | 180 | 240 | 240 |
| Polymer characteristics | End terminal content | [I] | % by mass | 25 | 0.4 | 6.7 | 6.7 | 0 |
|  |  | [II] | % by mass | 0.44 | 0.44 | 0.04 | 5.56 | 0.65 |
|  |  | [I] | mol/t | 250 | 4 | 67 | 67 | 0 |
|  |  | [II] | mol/t | 42 | 42 | 4 | 530 | 62 |
|  | Total number of moles [I] + [II] |  | mol/t | 292 | 46 | 71 | 597 | 62 |
|  | Molar ratio [I]/[II] |  | — | 6.02 | 0.10 | 16.12 | 0.13 | 0.00 |
|  | [NH$_2$] |  | mol/t | 230 | 70 | 110 | 20 | 42 |
|  | [COOH] |  | mol/t | 20 | 105 | 44 | 420 | 110 |
|  | Total number of moles [NH$_2$] + [COOH] |  | mol/t | 250 | 175 | 154 | 440 | 152 |
|  | Molar ratio [NH$_2$]/[COOH] |  | — | 11.50 | 0.67 | 2.50 | 0.05 | 0.38 |

|  |  |  |  | Comparative Example 6 | Comparative Example 7 | Comparative Example 8 | Comparative Example 9 |
|---|---|---|---|---|---|---|---|
|  | Raw materials | ε-Caprolactam | g | 20 | 20 | 20 | 20 |
|  |  | "JEFFAMINE" M1000 | g | 1.6 | 1.6 | — | — |
|  |  | "JEFFAMINE" M2070 | g | — | — | 3.5 | 5.0 |
|  |  | "JEFFAMINE" M600 | g | — | — | — | — |
|  |  | Benzoic acid | g | 0.00 | — | — | — |
|  |  | Acetic acid | g | — | — | — | — |
|  |  | Stearic acid | g | — | — | — | — |
|  |  | Cerotic acid | g | — | 1.71 | 1.71 | 1.14 |
|  |  | Ion-exchanged water | g | 20 | 20 | 20 | 20 |
|  | Nitrogen flow time |  | min | 240 | 360 | 360 | 360 |
| Polymer characteristics | End terminal content | [I] | % by mass | 6.8 | 6.7 | 15.2 | 21.7 |
|  |  | [II] | % by mass | 0.00 | 5.80 | 5.80 | 3.87 |
|  |  | [I] | mol/t | 68 | 67 | 75 | 107 |
|  |  | [II] | mol/t | 0 | 170 | 170 | 112 |
|  | Total number of moles [I] + [II] |  | mol/t | 68 | 237 | 245 | 219 |
|  | Molar ratio [I]/[II] |  | — | — | 0.40 | 0.44 | 0.96 |
|  | [NH$_2$] |  | mol/t | 114 | 20 | 20 | 32 |
|  | [COOH] |  | mol/t | 42 | 115 | 105 | 35 |
|  | Total number of moles [NH$_2$] + [COOH] |  | mol/t | 156 | 135 | 125 | 67 |
|  | Molar ratio [NH$_2$]/[COOH] |  | — | 2.71 | 0.17 | 0.19 | 0.91 |

TABLE 5-2

|  |  |  | Comparative Example 1 | Comparative Example 2 | Comparative Example 3 | Comparative Example 4 | Comparative Example 5 |
|---|---|---|---|---|---|---|---|
| Polymer characteristics | Melting point (Tm) | °C. | 217 | 220 | 220 | 215 | 220 |
|  | ηr | — | 1.22 | 2.16 | 1.83 | 1.07 | 2.22 |
|  | Weight average molecular weight (Mw) | ten thousand | 1.2 | 3.0 | 3.0 | 0.7 | 3.0 |
|  | Number average molecular weight (Mn) | ten thousand | 0.6 | 1.5 | 1.5 | 0.3 | 1.5 |
|  | Melt viscosity | Pa·s | 0.6 | 24.1 | 5.5 | 1.3 | 26.7 |
| Thermal stability at melt retention | Content retention | % | 68 | 88 | 78 | 54 | — |
|  | Melt viscosity retention | % | 183 | 107 | 154 | 304 | 106 |
|  | Weight average molecular weight retention | % | 105 | 114 | 110 | 109 | 109 |
|  | Mass reduction ratio | % | 7.2 | 3.3 | 4.5 | 9.6 | 2.5 |
| Molding processability | Melting point (Tm) +5° C. | — | ○ | X | ○ | ○ | X |
|  | Melting point (Tm) +10° C. | — | ○ | X | ○ | ○ | X |
|  | Melting point (Tm) +15° C. | — | ○ | X | ○ | ○ | X |
| Mechanical physical properties | Tensile elongation at break | % | 15 | >200 | 95 | 3 | >200 |

TABLE 5-2-continued

|  |  |  | Comparative Example 6 | Comparative Example 7 | Comparative Example 8 | Comparative Example 9 |
|---|---|---|---|---|---|---|
| Polymer characteristics | Melting point (Tm) | ° C. | 220 | 220 | 220 | 219 |
|  | ηr | — | 1.83 | 1.31 | 1.32 | 1.61 |
|  | Weight average molecular weight (Mw) | ten thousand | 3.0 | 1.7 | 1.7 | 2.4 |
|  | Number average molecular weight (Mn) | ten thousand | 1.5 | 0.9 | 0.9 | 1.2 |
|  | Melt viscosity | Pa · s | 5.5 | 1.9 | 2.1 | 2.4 |
| Thermal stability at melt retention | Content retention | % | 72 | 78 | 77 | 73 |
|  | Melt viscosity retention | % | 171 | 136 | 137 | 153 |
|  | Weight average molecular weight retention | % | 114 | 77 | 76 | 83 |
|  | Mass reduction ratio | % | 5.2 | 4.1 | 4.2 | 5.8 |
| Molding processability | Melting point (Tm) +5° C. | — | ◯ | ◯ | ◯ | ◯ |
|  | Melting point (Tm) +10° C. | — | ◯ | ◯ | ◯ | ◯ |
|  | Melting point (Tm) +15° C. | — | ◯ | ◯ | ◯ | ◯ |
| Mechanical physical properties | Tensile elongation at break | % | 90 | 125 | 90 | 130 |

TABLE 6-1

|  |  |  | Example 36 | Example 37 |
|---|---|---|---|---|
| Raw materials | Hexamethylenediamine | g | 9.46 | 7.74 |
|  | Adipic acid | g | 11.92 | — |
|  | Sebacic acid | g | — | 13.46 |
|  | "JEFFAMINE" M1000 | g | 1.6 | 1.6 |
|  | "JEFFAMINE" M2070 | g | — | — |
|  | "JEFFAMINE" M600 | g | — | — |
|  | Benzoic acid | g | 0.14 | 0.14 |
|  | Ion-exchanged water | g | 20 | 20 |
|  | Nitrogen flow time | min | 240 | 240 |
| Polymer characteristics | End terminal content | [I] % by mass | 7.3 | 7.3 |
|  |  | [II] % by mass | 0.48 | 0.49 |
|  |  | [I] mol/t | 73 | 73 |
|  |  | [II] mol/t | 46 | 47 |
|  | Total number of moles [I] + [II] | mol/t | 119 | 120 |
|  | Molar ratio [I]/[II] | — | 1.60 | 1.56 |
|  | [NH₂] | mol/t | 71 | 70 |
|  | [COOH] | mol/t | 39 | 38 |
|  | Total number of moles [NH₂] + [COOH] | mol/t | 110 | 108 |
|  | Molar ratio [NH2]/[COOH] | — | 1.82 | 1.84 |

TABLE 6-2

|  |  |  | Example 36 | Example 37 |
|---|---|---|---|---|
| Polymer characteristics | Melting point (Tm) | ° C. | 260 | 222 |
|  | ηr | — | 1.85 | 1.86 |
|  | Weight average molecular weight (Mw) | ten thousand | 3.0 | 3.0 |
|  | Number average molecular weight (Mn) | ten thousand | 1.5 | 1.5 |
|  | Melt viscosity | Pa · s | 5.8 | 6.1 |
| Thermal stability at melt retention | Content retention | % | 92 | 92 |
|  | Melt viscosity retention | % | 105 | 106 |
|  | Weight average molecular weight retention | % | 107 | 106 |
|  | Mass reduction ratio | % | 2.8 | 2.9 |
| Molding processability | Melting point (Tm) +5° C. | — | ◯ | ◯ |
|  | Melting point (Tm) +10° C. | — | ◯ | ◯ |
|  | Melting point (Tm) +15° C. | — | ◯ | ◯ |
| Mechanical physical properties | Tensile elongation at break | % | >200 | >200 |

Comparison of Examples 1 to 26 and 32 to 37 with Comparative Examples 1 to 6, comparison of Example 30 with Comparative Example 7 and comparison of Example 31 with Comparative Examples 8 and 9 show that the end modified polyamide 6 resin containing the end structure represented by the general formula (I) and the end structure represented by the formula (II), in a specific range, can attain both excellent molding processability and thermal stability at melt retention. In particular, comparison of Example 1 with Comparative Examples 1 and 4 shows that as the content of the end structure represented by the general formula (I) or the end structure represented by the general formula (II) increases, the thermal stability at melt retention is deteriorated. Further, it is apparent that the molecular weight decreases, and the mechanical characteristic is deteriorated. In addition, comparison of Example 1 with Comparative Examples 2 and 5 shows that when the content of the end structure represented by the general formula (I) decreases, melt fluidity is reduced, so that molding processability is deteriorated. Comparison of Example 1 with Comparative Examples 3 and 6 shows that when the content of the end structure represented by the general formula (II) decreases, thermal stability at melt retention and mechanical physical properties are deteriorated.

Comparison of Example 9 with Example 14 and comparison of Examples 2, 23 and 25 with Example 15 show that when the total ([I]+[II]) of the content [I] of the end structure represented by the general formula (I) and the content (II) of the end structure represented by the general formula (II) is 250 mol/t or less, thermal stability at melt retention and the mechanical characteristic can be further improved. On the other hand, comparison of Examples 1, 3 to 5, 8, 24 and 26 with Examples 16, 32 and 33 shows that when the total ([I]+[II]) of the contents of the end structures is 60 mol/t or more, a reduction in molecular weight retention at melt retention can be further suppressed to further improve thermal stability at melt retention and molding processability. In addition, comparison of Examples 2, 23 and 25 with Examples 17, 19, 34 and 35 and comparison of Examples 1, 3 to 5, 8, 24 and 26 with Example 18 show that when the molar ratio ([I]/[II]) is 2.5 or less, thermal stability at melt retention and the mechanical characteristic can be further improved. On the other hand, comparison of Examples 2, 23 and 25 and Example 21, and comparison of Examples 1, 3 to 5, 8, 24 and 26 with Example 20 show that when the molar ratio ([I]/[II]) is 0.3 or more, molding processability, and thermal stability at melt retention can be further improved.

Comparison of Example 7 with Example 22 shows that when the total amount of the amino end group [NH$_2$] and the carboxyl end group [COOH] is 50 mol/t or more, thermal stability at melt retention can be further improved. On the other hand, comparison of Example 2 with Examples 23 and 25 shows that when the total amount of the amino end group [NH$_2$] and the carboxyl end group [COOH] is 150 mol/t or less, thermal stability at melt retention, and the mechanical characteristic can be further improved. In addition, comparison of Example 1 with Example 24 shows that when the molar ratio [NH$_2$]/[COOH] is 0.5 or more, thermal stability at melt retention can be further improved. On the other hand, comparison of Examples 1, 3 to 5 and 8 with Example 26 shows that when the molar ratio [NH$_2$] [COOH] is 2.5 or less, thermal stability at melt retention can be further improved.

The end modified polyamide resin of the present invention can be molded into a desired shape by any molding method such as injection molding, extrusion molding, blow molding, vacuum molding, melt spinning or film molding. Molded articles obtained by molding the end modified polyamide resin can be used as, for example, resin molded articles such as electric and electronic device components, automobile components and machine components, fibers for clothing and industrial materials, and films for packaging and magnetic recording.

The invention claimed is:

1. An end modified polyamide resin containing 1 to 20% by mass of an end structure represented by general formula (I) below and 0.1 to 5% by mass of an end structure represented by general formula (II) below:

$$—X—(R^1—O)_m—R^2 \quad (I)$$

wherein m represents 2 to 100; R$^1$ represents a divalent hydrocarbon group having 2 to 10 carbon atoms, and R$^2$ represents a monovalent hydrocarbon group having 1 to 30 carbon atoms; and —X— represents —NH—, —N(CH$_3$)— or —(C=O)—; and m R$^1$s in the general formula (I) may be the same or different, and $$—Y—R^3 \quad (II)$$

wherein R$^3$ represents a monovalent hydrocarbon group having 1 to 30 carbon atoms; and —Y— in the general formula (II) represents —(C=O)— when X in the general formula (I) is —NH— or —N(CH$_3$)—, Y in the general formula (II) represents —NH— or —N(CH$_3$)— when X in the general formula (I) is —(C=O)—.

2. The end modified polyamide resin according to claim 1, wherein the end modified polyamide resin contains 60 to 250 [mol/t] in total of the end structure represented by the general formula (I) and the end structure represented by the general formula (II), and the ratio ((I)/(II)) of the content [mol/t] of the end structure represented by the general formula (I) and the content [mol/t] of the end structure represented by the general formula (II) is 0.3 to 2.5.

3. The end modified polyamide resin according to claim 2, wherein the end modified polyamide resin contains 50 to 150 [mol/t] in total of an amino end group and a carboxyl end group, and the ratio of the content [mol/t] of the amino end group and the content [mol/t] of the carboxyl end group (amino end group/carboxyl end group) is 0.5 to 2.5.

4. The end modified polyamide resin according to claim 2, wherein the relative viscosity (ηr) of a 98% sulfuric acid solution having a resin concentration of 0.01 g/ml is 1.3 to 3.0 at 25° C.

5. The end modified polyamide resin according to claim 2, wherein the weight average molecular weight Mw measured by gel permeation chromatography is 15,000 to 50,000.

6. The end modified polyamide resin according to claim 2, wherein the melt viscosity at a melting point+60° C. and a shear rate of 9728 sec$^{-1}$ is 30 Pa·s or less.

7. The end modified polyamide resin according to claim 2, wherein the content retention ((content after retention/content before retention)×100) of the structure represented by the general formula (I) before and after retention for 60 minutes at a melting point+60° C. is 80% or more.

8. The end modified polyamide resin according to claim 2, wherein the weight average molecular weight retention ((weight average molecular weight after retention/weight average molecular weight before retention)×100) before and after retention for 60 minutes at a melting point+60° C. is 80% to 120%.

9. The end modified polyamide resin according to claim 2, wherein the melt viscosity retention ((melt viscosity after retention/melt viscosity before retention)×100) before and after retention for 60 minutes at a melting point+60° C. is 80% to 120%.

10. The end modified polyamide resin according to claim 2, wherein the mass reduction ratio before and after retention for 40 minutes under a nitrogen atmosphere at a melting point+60° C. is 4% or less.

11. A method for producing the end modified polyamide resin according to claim 2, the method comprising adding, in polymerization of at least one selected from the group consisting of a combination of a diamine and a dicarboxylic acid, an amino acid and a lactam, 1 to 20% by mass of a terminal modification agent represented by general formula (III) below based on the total amount of the diamine, dicarboxylic acid, the amino acid and the lactam, and 0.01 to 5% by mass of a terminal modification agent represented by general formula (IV) below based on the total amount of the diamine, dicarboxylic acid, the amino acid and the lactam, to bond the terminal modification agents to the end of the polyamide resin:

$$H—X'—(R^1—O)_m—R^2 \quad (III)$$

wherein m represents 2 to 100; R$^1$ represents a divalent hydrocarbon group having 2 to 10 carbon atoms, and R$^2$ represents a monovalent hydrocarbon group having 1 to 30 carbon atoms; and —X'— represents —NH—, —N(CH$_3$)— or —O(C=O)—; and m R$^1$s in the general formula (III) may be the same or different, and $$H—Y'—R^3 \quad (IV)$$

wherein $R^3$ represents a monovalent hydrocarbon group having 1 to 30 carbon atoms; and —Y— in the general formula (IV) represents —O(C=O)— when X' in the general formula (III) is —NH— or —N(CH$_3$)—, Y' in the general formula (IV) represents —NH— or —N(CH$_3$)— when X in the general formula (III) is —O(C=O)—.

* * * * *